US012803308B2

(12) United States Patent
Dong

(10) Patent No.: US 12,803,308 B2
(45) Date of Patent: Nov. 17, 2026

(54) WIRELESS CHARGING STRUCTURE WITH AUTOMATICALLY EJECTING WIRELESS CHARGING MODULE AND CHARGER

(71) Applicant: Chang Dong, Shenzhen City (CN)

(72) Inventor: Chang Dong, Shenzhen City (CN)

( * ) Notice: Subject to any disclaimer, the term of this patent is extended or adjusted under 35 U.S.C. 154(b) by 0 days.

(21) Appl. No.: 19/435,886

(22) Filed: Dec. 30, 2025

(65) Prior Publication Data

US 2026/0213559 A1 Jul. 23, 2026

(30) Foreign Application Priority Data

Jan. 21, 2025 (CN) ......................... 202520136088.3
Mar. 31, 2025 (CN) ......................... 202510393478.3

(51) Int. Cl.

*H02J 7/00* (2026.01)
*H02J 7/70* (2026.01)
*H02J 50/00* (2016.01)
*H02J 50/40* (2016.01)
*E05F 1/12* (2006.01)
*H02J 50/10* (2016.01)

(52) U.S. Cl.

CPC ............ *H02J 7/731* (2026.01); *H02J 50/005* (2020.01); *H02J 50/40* (2016.02); *E05F 1/12* (2013.01); *H02J 50/10* (2016.02)

(58) Field of Classification Search

CPC .......... H02J 50/005; H02J 50/40; H02J 50/10; H02J 7/731; E05F 1/12

USPC ................................ 320/107, 108, 114, 115

See application file for complete search history.

(56) References Cited

U.S. PATENT DOCUMENTS 9,608,475 B1 * 3/2017 Karanikos .............. H02J 50/10
2024/0421619 A1 12/2024 Li
2025/0105676 A1 3/2025 Li

FOREIGN PATENT DOCUMENTS

CN 222321172 U * 1/2025

* cited by examiner

*Primary Examiner* — Zixuan Zhou

(74) *Attorney, Agent, or Firm* — Cooper Legal Group, LLC

(57) ABSTRACT

A wireless charging structure with an automatically ejecting wireless charging module and a charger. The wireless charging structure includes a first housing, a front side of which defines a receiving groove for receiving the wireless charging module. A top of the wireless charging module is elastically hinged to a top inside the receiving groove to have a tendency to flip outward. A locking structure and a triggering structure are further arranged inside the first housing. The locking structure has an unlocked state and a locked state; in the unlocked state, the locking structure is separated from the wireless charging module, causing the wireless charging module to be ejected outward; in the locked state, the locking structure is connected to the wireless charging module, limiting the wireless charging module within the receiving groove. The triggering structure is configured to drive the locking structure to separate from the wireless charging module.

24 Claims, 30 Drawing Sheets

WIRELESS CHARGING STRUCTURE WITH AUTOMATICALLY EJECTING WIRELESS CHARGING MODULE AND CHARGER

CROSS-REFERENCE TO RELATED APPLICATIONS

The present application claims priority to and the benefit of Chinese Patent Application No. 202510393478.3, titled "Wireless Charging Structure with Automatically Ejecting Wireless Charging Module and Charger", filed on Mar. 31, 2025, and Chinese Patent Application No. 202520136088.3, titled "A Wireless Charger", filed on Jan. 21, 2025. The entire contents of Chinese Patent Application No. 202510393478.3 and Chinese Patent Application No. 202520136088.3 are incorporated herein by reference.

TECHNICAL FIELD

The present disclosure relates to the technical field of charging devices, and in particular, to a wireless charging structure with an automatically ejecting wireless charging module and a charger.

BACKGROUND

With the continuous development of wireless charging technology, wireless charging devices have gained wide popularity among consumers. However, some existing wireless charging modules are often stored in a receiving groove. During use, a user must manually pry or flip the wireless charging module out of the receiving groove to charge an electronic device such as a smartwatch. This operation is very inconvenient and may easily injure the user's hand.

SUMMARY OF THE DISCLOSURE

The present disclosure provides a wireless charging structure with an automatically ejecting wireless charging module and a charger, which solve the problem of inconvenient operation in existing wireless charging devices.

To achieve the above purpose, the present disclosure proposes a wireless charging structure with a wireless charging module that is capable of automatically ejecting, including: a first housing;

wherein a front side of the first housing defines a receiving groove, the wireless charging module is arranged in the receiving groove and capable of flipping outward; a top of the wireless charging module is elastically hinged to a top inside the receiving groove, causing the wireless charging module to have a tendency to flip outward from the receiving groove; a locking structure and a triggering structure are further arranged inside the first housing;

wherein the locking structure has an unlocked state and a locked state; in the unlocked state, the locking structure is separated from the wireless charging module, causing the wireless charging module to be ejected outward from the receiving groove; in the locked state, the locking structure is connected to the wireless charging module, limiting the wireless charging module within the receiving groove;

the triggering structure is configured to drive the locking structure to separate from the wireless charging module.

The present disclosure further proposes a charger, including a wireless charging structure with a wireless charging module that is capable of automatically ejecting; the wireless charging structure includes: a first housing;

wherein a front side of the first housing defines a receiving groove, the wireless charging module is arranged in the receiving groove and capable of flipping outward; a top of the wireless charging module is elastically hinged to a top inside the receiving groove, causing the wireless charging module to have a tendency to flip outward from the receiving groove; a locking structure and a triggering structure are further arranged inside the first housing;

wherein the locking structure has an unlocked state and a locked state; in the unlocked state, the locking structure is separated from the wireless charging module, causing the wireless charging module to be ejected outward from the receiving groove; in the locked state, the locking structure is connected to the wireless charging module, limiting the wireless charging module within the receiving groove;

the triggering structure is configured to drive the locking structure to separate from the wireless charging module;

wherein a bottom of the first housing of the wireless charging structure is hinged with a second housing; the triggering structure is arranged on the bottom of the first housing; a part of the triggering structure of the wireless charging structure is exposed outside the first housing;

in a case where the second housing is folded onto a front side of the first housing, the wireless charging module is limited within the receiving groove of the first housing and is connected to the locking structure of the wireless charging structure;

in a case where the second housing is unfolded relative to the first housing, the trigger structure is triggered to drive the locking structure to switch to the unlocked state, causing the wireless charging module to be ejected outward from the receiving groove.

The beneficial effects of the present disclosure are: By elastically hinging the wireless charging module within the receiving groove, and in combination with the locking structure and the triggering structure, the wireless charging module can automatically eject from the receiving groove when in use, making it more convenient to operate.

BRIEF DESCRIPTION OF THE DRAWINGS

In order to explain the technical solutions in the embodiments of the present disclosure more clearly, the following will briefly introduce the drawings required to be used in the description of the embodiments. Obviously, the drawings in the following description are only some embodiments of the present disclosure. For those skilled in the art, other drawings may be obtained from these drawings without creative effort.

REFERENCE NUMERALS

Figure 1:
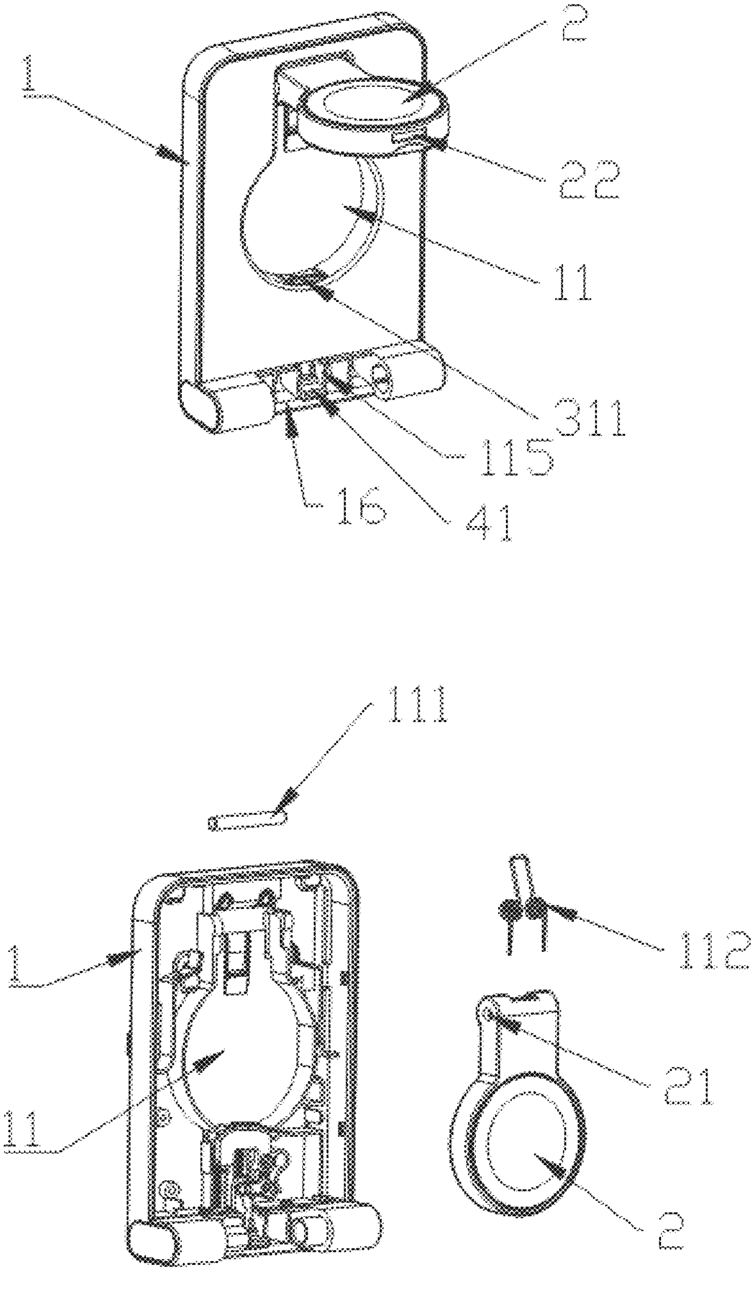
FIG. 1 is a schematic diagram of the installation of a wireless charging structure of the present disclosure.

1, first housing; 11, receiving groove; 111, first hinge shaft; 112, first elastic member; 113, connection port; 114, second hinge shaft; 115, travel gap; 12, first limiting groove; 13, first sliding groove; 14, second limiting groove; 15, toggle groove; 16, mounting notch; 2, wireless charging module; 21, hinge hole; 22, locking groove; 23, avoidance inclined surface; 3, locking structure; 31, buckle; 311, arc-shaped contact portion; 3111, guiding inclined surface; 312, swing arm; 3121, first hinge portion; 3122, first stop block; 3123, arc-shaped elastic member; 3124, third hinge shaft; 3125, third arc-shaped protrusion; 313, first limiting block; 314, toggle rod; 32, second elastic member; 4, trigger structure; 41, trigger piece; 411, second limiting block; 412, third elastic member; 413, second sliding groove; 4131, first arc-shaped protrusion; 414, second arc-shaped protrusion; 415, engagement groove; 416, connecting arm; 42, driving member; 421, second hinge portion; 422, second stop block; 423, inclined surface; 424, driving arm; 4241, sliding rod; 5, second housing; 51, connecting sleeve; 511, groove; 52, first wireless charging component; 6, third housing; 61, second wireless charging component.

The realization of the objectives, functional features, and advantages of the present disclosure will be further described in combination with the embodiments and with reference to the accompanying drawings.

DETAILED DESCRIPTION

The technical solutions in the embodiments of the present disclosure will be described clearly and completely below in conjunction with the accompanying drawings in the embodiments of the present disclosure. Obviously, the described embodiments are only a part of the embodiments of the present disclosure, and not all of them. Based on the embodiments in the present disclosure, all other embodiments obtained by those skilled in the art without making creative efforts shall fall within the scope of the present disclosure. In addition, the technical solutions of the various embodiments may be combined with each other, but it must be based on the premise that it can be realized by those skilled in the art. When the combination of technical solutions contradicts each other or cannot be realized, it should be considered that such a combination of technical solutions does not exist and is not within the scope of protection claimed by the present disclosure.

It should be noted that when directional indications (such as up, down, left, right, front, back, . . . ) are involved in the embodiments of the present disclosure, these directional indications are only intended to explain the relative positional relationships, movement conditions, etc. between various components in a specific posture. When the specific posture changes, the directional indications will change accordingly.

In the embodiments of the present disclosure, unless otherwise clearly specified and limited, a first feature being "on" or "under" a second feature may mean that the first and second features are in direct contact, or that the first and second features are in indirect contact through an intermediate medium. Moreover, the first feature being "above", "over", and "on" the second feature may mean that the first feature is directly above or obliquely above the second feature, or merely indicates that the horizontal height of the first feature is higher than that of the second feature. The first feature being "below", "under", and "beneath" the second feature may mean that the first feature is directly below or obliquely below the second feature, or merely indicates that the horizontal height of the first feature is lower than that of the second feature.

In the embodiments of the present disclosure, unless otherwise clearly specified and limited, terms such as "installed", "connected", "linked", and "fixed" should be interpreted broadly. For example, it may be a fixed connection, a detachable connection, or an integral connection; it may be a mechanical connection, an electrical connection, or mutual communication; it may be a direct connection, an indirect connection through an intermediate medium, an internal connection between two elements, or an interaction relationship between two elements. Unless otherwise explicitly defined, persons of ordinary skill in the art can understand the specific meanings of the above terms in the present disclosure according to specific situations.

In addition, when descriptions such as "first" and "second" are involved in the embodiments of the present disclosure, these descriptions of "first" and "second" are for descriptive purposes only and cannot be understood as indicating or implying relative importance or implicitly indicating the number of indicated technical features. Thus, features defined as "first" and "second" may explicitly or implicitly include at least one such feature. Furthermore, the meaning of "and/or" appearing in the entire text is to include three parallel schemes. Taking "A and/or B" as an example, it includes scheme A, or scheme B, or a scheme that satisfies both A and B.

In the related art, with the popularization of wireless charging technology, various charging devices with built-in wireless charging modules have appeared on the market. In order to adapt to charging external electronic devices such as earphones and watches, some charging devices on the market have a wireless charging module embedded in a receiving groove, which can be flipped outward to open. However, this type of wireless charging module requires users to manually pry the edge of the wireless charging module to flip it open. The operation is inconvenient, and there is a risk of finger cuts due to sharp edges of the module during the operation.

Based on this, the present disclosure proposes a wireless charging structure with an automatically ejecting wireless charging module.

In some embodiments of the present disclosure, referring to FIG. 1 to FIG. 15. A wireless charging structure with an automatically ejecting wireless charging module 2 includes a first housing 1. A receiving groove 11 is defined on a front side of the first housing 1. The wireless charging module 2 that can flip outward is arranged in the receiving groove 11. A top of the wireless charging module 2 is elastically hinged to a top inside the receiving groove 11, such that the wireless charging module 2 has a tendency to flip outward from the receiving groove 11. A locking structure 3 and a trigger structure 4 are further arranged inside the first housing 1.

The locking structure 3 has two states: an unlocked state and a locked state. In the unlocked state, the locking structure 3 is separated from the wireless charging module 2, such that the wireless charging module 2 is ejected outward from the receiving groove 11. In the locked state, the locking structure 3 is connected to the wireless charging module 2, limiting the wireless charging module 2 in the receiving groove 11. The trigger structure 4 is configured to drive the locking structure 3 to separate it from the wireless charging module 2.

In the embodiments, the shape of the first housing 1 may be various, for example, the outer contour shape of the first housing 1 is circular, rectangular, rounded rectangular, elliptical, semi-elliptical, etc. The shape of the first housing 1 may be selected and designed according to actual needs, and is not specifically limited herein. The first housing 1 may be made of hard plastic, metal, or other materials. The receiving groove 11 may be defined by recessing a central area of the front surface of the first housing 1. The depth of the receiving groove 11 may be equal to or slightly greater than the thickness of the wireless charging module 2, to ensure that the wireless charging module 2 is flush with or slightly lower than the housing surface when fully retracted. It can be understood that the shape of the receiving groove 11 matches the outer contour shape of the wireless charging module 2, to better receive the wireless charging module 2. The shape of the wireless charging module 2 may also be various, for example, the wireless charging module 2 may be rectangular, disk-shaped, or elliptical disk-shaped. Generally, the wireless charging module 2 includes a rectangular arm and a disk structure. A coil is arranged on/in the disk structure, and the rectangular arm is configured to connect the disk structure and the first housing 1. The wireless charging module 2 refers to a module that can transmit electrical energy to an electronic device in a wireless manner without electrical wires. The wireless charging module 2 includes a circuit board, a transmitting coil, and a housing. The transmitting coil is typically wound with copper wire (Litz Wire) into a circular or square shape. After power is applied, when a receiving coil of the electronic device is aligned with the transmitting coil of the wireless charging module, the wireless charging module supplies power to the electronic device wirelessly through the principle of electromagnetic induction or magnetic resonance. The wireless charging module 2 can specifically perform wireless power transmission for electronic devices such as watches and earphones.

Herein, the top of the wireless charging module 2 being elastically hinged to the top inside the receiving groove 11 means that the top of the wireless charging module 2 and the top of the receiving groove 11 are rotatably connected through an elastic element. Specifically, a structure of a hinge shaft cooperating with a torsion spring may be used. An end of the torsion spring is fixed to the inner wall of the receiving groove 11, and the other end of the torsion spring is connected to the wireless charging module 2, providing an elastic force for outward flipping, such that the wireless charging module 2 maintains elastic potential energy for outward flipping in its natural state.

The locking structure 3 may be a component that forms a detachable mechanical connection with the wireless charging module 2. For example, the wireless charging module 2 and the locking structure 3 may achieve limitation through a buckle or pin mechanism, and the state switching relies on the driving of the trigger structure 4. The trigger structure 4 correspondingly refers to a mechanical transmission component operable by the user or linkable by an external module, such as a sliding button, a slider, or a lever device, to transmit external operating force to the locking structure 3. Of course, the locking structure 3 may otherwise be an electromagnetic iron mechanism that magnetically cooperates with the wireless charging module 2. The trigger structure 4 correspondingly refers to a button or key structure operable by the user or triggerable by an external module, to control power-off of the electromagnetic iron structure after being triggered, such that the magnetic attraction force between the locking structure 3 and the wireless charging module 2 disappears, and then the wireless charging module 2 can be automatically ejected outward from the receiving groove 11.

Specifically, when the locking structure 3 is in the locked state, it forms a mechanical or magnetic connection with a cooperating portion of the wireless charging module 2, overcoming the flipping tendency generated by the elastic hinge, limiting the movement of the wireless charging module 2, and thereby keeping the wireless charging module 2 stably received in the groove. When the user operates the trigger structure 4 or the trigger structure 4 is linked by an external module, the locking structure 3 releases the constraint on the wireless charging module 2 through mechanical transmission or power cut-off. In this case, the elastic potential energy drives the wireless charging module 2 to flip outward and pop out. After use, the wireless charging module 2 can be pressed back into the receiving groove 11 manually, and the locking structure 3 automatically returns to the locked state during the reset process.

The wireless charging structure of the present disclosure makes the top of the wireless charging module 2 elastically hinged in the receiving groove 11, and limits the wireless charging module 2 in the receiving groove 11 through the locking structure 3. The unlocking of the locking structure 3 is triggered and driven by the trigger structure 4. During use, the user can drive the locking structure 3 to unlock by triggering the trigger structure 4 or by linking an external module to the trigger structure 4. The elastic hinge provides the power for automatic ejection, allowing the wireless charging module 2 to automatically unfold under the action of elastic potential energy. The unfolding operation of the wireless charging module 2 is simplified to a single triggering action. Only the trigger structure 4 needs to be driven to complete the unlocking, which is extremely convenient to operate. Compared with the traditional operation of manually flipping the wireless charging module 2, the proposed design in the present disclosure may avoid direct contact of the user with the edge of the module, reducing the risk of scratches and buckle deformation. Therefore, the wireless charging structure of the present disclosure ensures structural compactness while achieving the automatic popping operation of the wireless charging module 2, thereby effectively solving the inconvenience and safety hazards brought by manually unfolding the wireless charging module 2.

Figure 2:
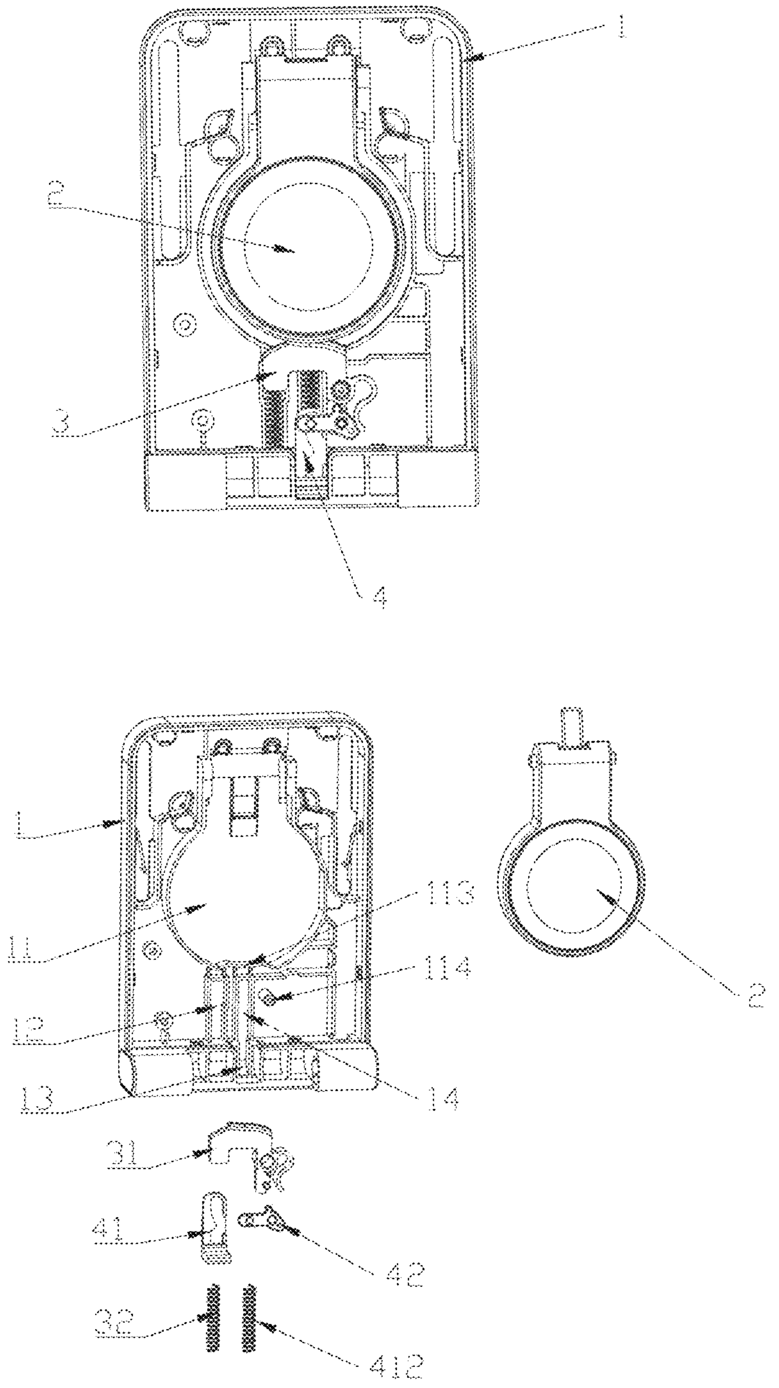
FIG. 2 is a schematic diagram of the installation of a locking structure and a trigger structure of the present disclosure.
Figure 11:
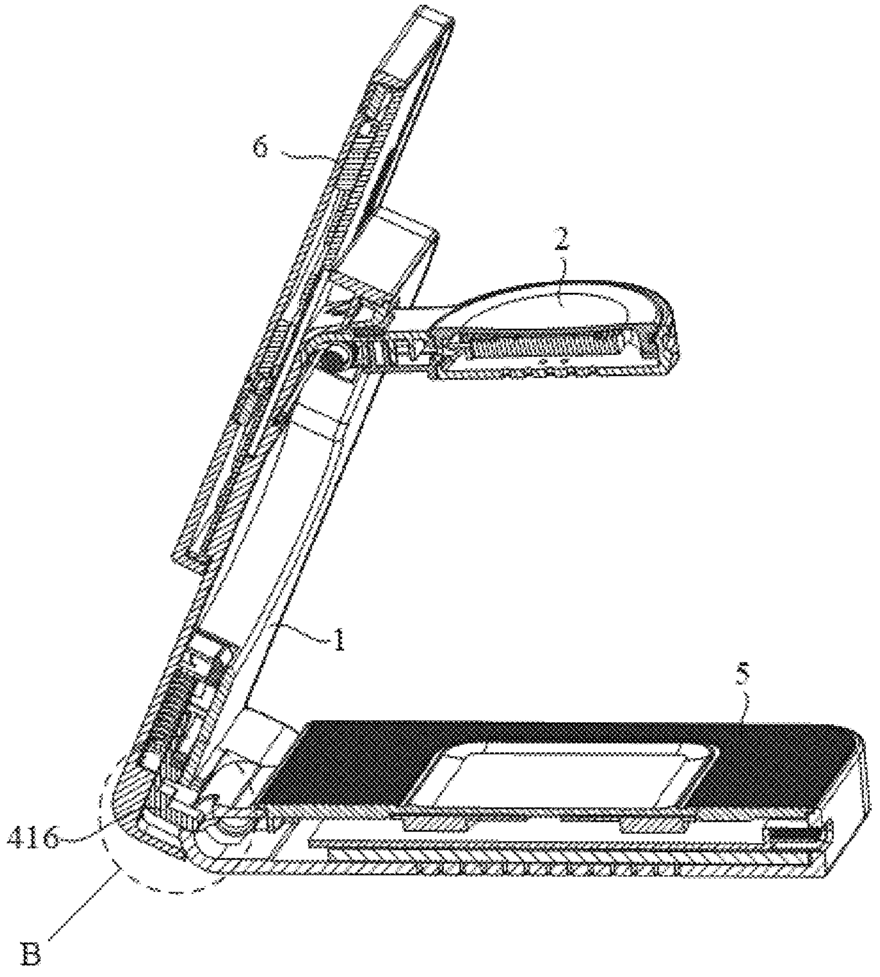
FIG. 11 is a cross-sectional view of the charger in FIG. 9 from one angle.
Figure 12:
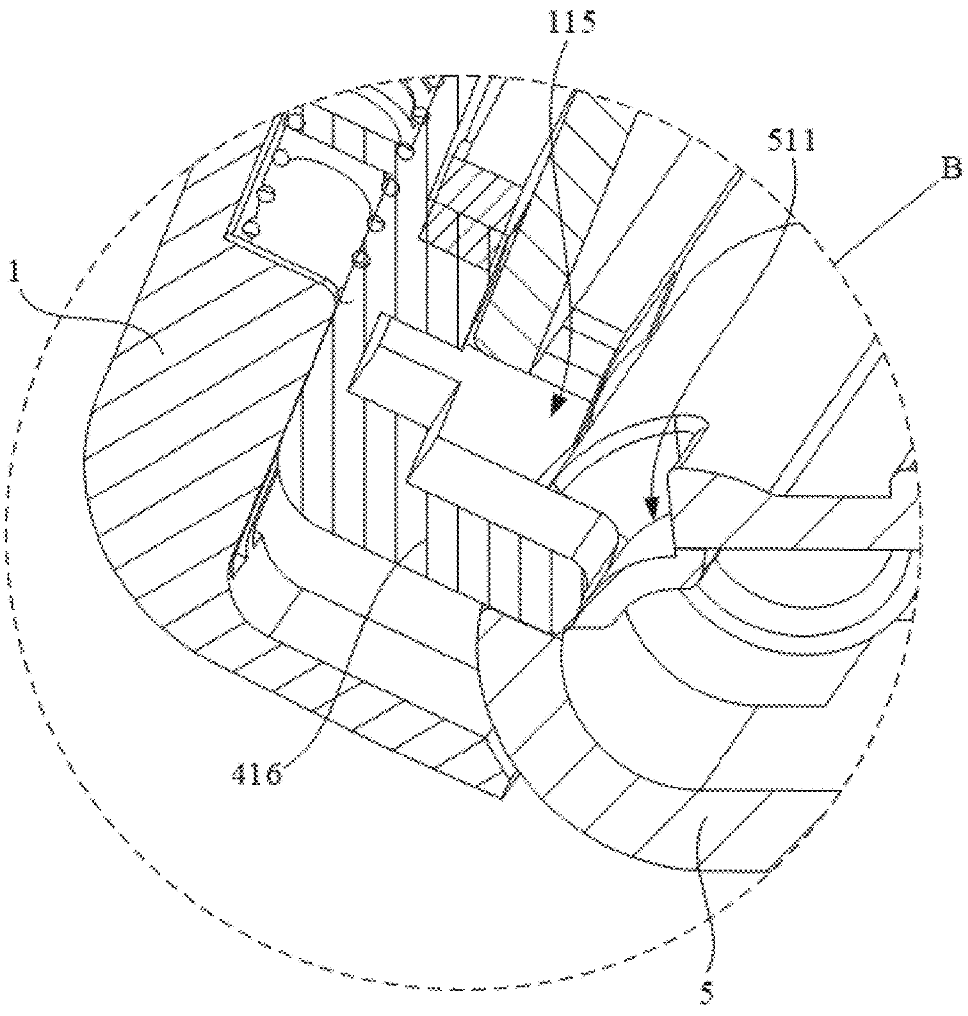
FIG. 12 is a partial enlarged view of area B circumscribed in FIG. 11.
Figure 13:
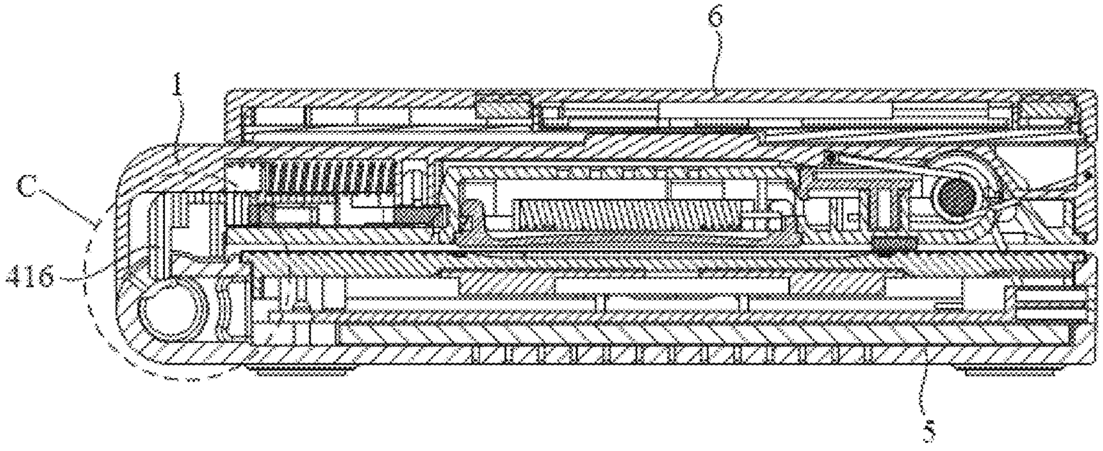
FIG. 13 is a cross-sectional view of the charger in FIG. 9 in a folded state from one angle.
Figure 14:
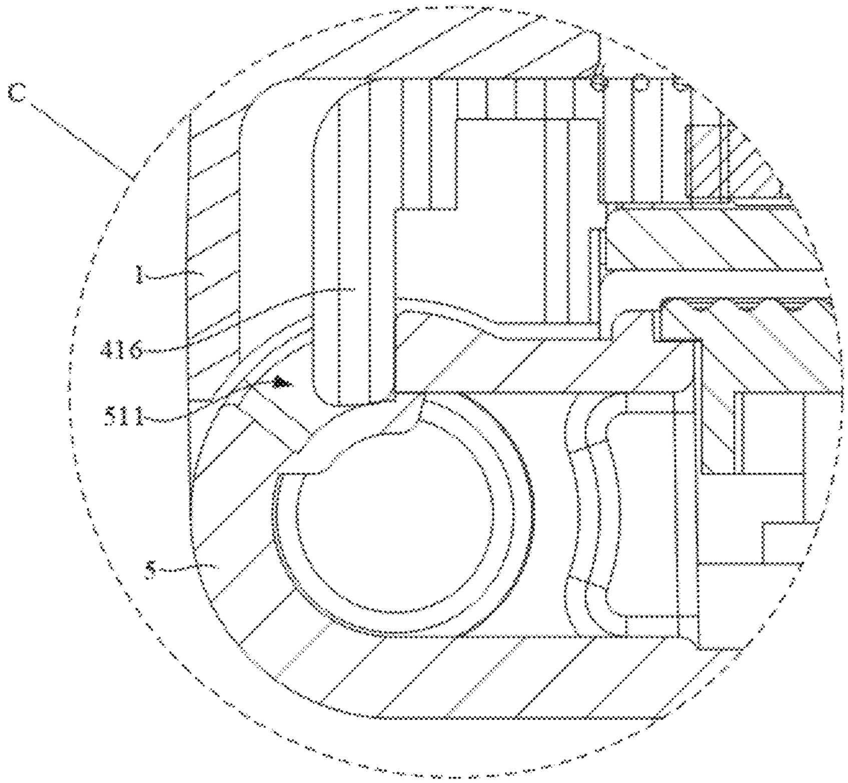
FIG. 14 is a partial enlarged view of area C circumscribed in FIG. 13.
Figure 15:
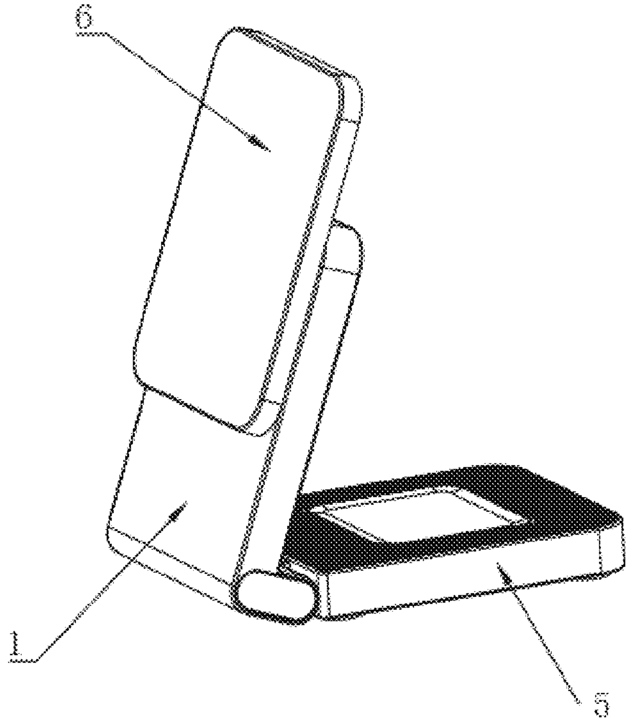
FIG. 15 is a schematic structural diagram of the charger in FIG. 9 from another angle.

The present disclosure further proposes that, as shown in FIGS. 1, 2, and 11, one of the top of the receiving groove 11 and the top of the wireless charging module 2 is arranged with a first hinge shaft 111, and the other of the top of the receiving groove 11 and the top of the wireless charging module 2 defines a hinge hole 21. The first hinge shaft 111 is movably inserted through the hinge hole 21. A first elastic member 112 is arranged on the first hinge shaft 111. Under the elastic force of the first elastic member 112, the wireless charging module 2 has a tendency to flip outward from the receiving groove 11.

In the embodiments, the first hinge shaft 111 refers to a shaft structure that realizes rotational motion, which may be specifically implemented using a cylindrical metal rod. The diameter of the first hinge shaft 111 forms a clearance fit with the hinge hole 21. The hinge hole 21 refers to a hole structure that accommodates the first hinge shaft 111, which may be specifically implemented using a circular through-hole or a U-shaped slot structure. The inner wall of the hinge hole 21 contacts the surface of the first hinge shaft 111 to form a revolute pair. The first elastic member 112 refers to an element that provides elastic restoring force. The first elastic member 112 may specifically be a single torsion spring, a double torsion spring, a spring leaf, etc. Two ends of the first elastic member 112 are respectively fixed to the wireless charging module 2 and the inner wall of the receiving groove 11, thereby generating a torque that causes the wireless charging module 2 to flip outward through elastic deformation.

Specifically, when the wireless charging module 2 is in a retracted state, the first elastic member 112 generates a preload force, giving the wireless charging module 2 a tendency to flip outward from the receiving groove 11. In this case, the elastic force of the first elastic member 112 is offset by the locking structure 3, such that the wireless charging module 2 is limited and fixed in the receiving groove 11 by the locking structure 3. When the locking structure 3 releases the limitation and is in the unlocked state, the elastic force of the first elastic member 112 directly acts on the wireless charging module 2, driving the wireless charging module 2 to rotate outward around an axis of the first hinge shaft 111. Moreover, the first elastic member 112 can further cooperate with the groove wall of the receiving groove 11 to support the wireless charging module 2, keeping it at a certain flipping angle (for example: the angle with a bottom surface of the receiving groove 11 is greater than 90 degrees, such that the wireless charging module 2 is in a horizontal state or close to a horizontal state relative to the supporting surface) for charging the electronic devices such as watches. The clearance fit between the first hinge shaft 111 and the hinge hole 21 allows the wireless charging module 2 to maintain axial stability during the flipping process, avoiding lateral deviation.

Specifically, the first elastic member 112 may be a torsion spring. The torsion spring includes a torsion spring main body, a first torsion arm, and a second torsion arm, where the first torsion arm and the second torsion extend from opposite sides of the torsion spring main body. The torsion spring main body is sleeved outside the first hinge shaft 111. The first torsion arm abuts against the wireless charging module 2, and the second torsion arm abuts against the bottom wall of the receiving groove 11, so as to support the wireless charging module 2 and keep it at a certain flipping angle through the action of the torsion spring. By making the first elastic member 112 a torsion spring, the first elastic member 112 can provide stable torque output, save space, and adapt to the narrow space between the wireless charging module 2 and the receiving groove 11. In practice, the angle and torque of the first and second torsion arms can be designed to control the ejection force of the wireless charging module 2.

This solution realizes the automatic ejection function of the wireless charging module 2 through an elastic hinge structure, with a simple and stable structure and a long service life. By making the torque output direction of the first elastic member 112 form a moment balance with the position of the module's center of gravity, the flipping action is ensured to be smooth and controllable. Moreover, integrating the first elastic member 112 on the first hinge shaft 111 makes the torque center coincide with the rotation center, thereby significantly improving energy transmission efficiency.

In some embodiments, a first hinge shaft 111 is arranged in the horizontal direction at the top inside the receiving groove 11, and a hinge hole 21 is horizontally penetrated through the top of the wireless charging module 2. The first hinge shaft 111 is movably inserted through the hinge hole 21. A first elastic member 112 is arranged on the first hinge shaft 111. Under the elastic force of the first elastic member 112, the wireless charging module 2 has a tendency to flip outward from the receiving groove 11. The first elastic member 112 may be an existing single torsion spring, double torsion spring, etc. For example: a single torsion spring includes a spring main body and two torsion arms extending from the spring main body. The two torsion arms can respectively abut on the wireless charging module 2 (or inside the wireless charging module 2) and the inner wall of the receiving groove 11 on the back of the wireless charging module 2. Under the action of the single torsion spring, the wireless charging module 2 has a tendency to flip outward from the receiving groove 11, and can further support (or cooperate with a damping structure such as a damping washer on the first hinge shaft 111 to support) the wireless charging module 2 to keep it at a certain flipping angle (for example: a horizontal state or a state close to horizontal) to charge the electronic device such as watches.

In some embodiments, referring to FIGS. 2 to 7, a connection port 113 communicated to the inner cavity of the first housing 1 is defined on the groove wall of the receiving groove 11. The locking structure 3 includes a second elastic member 32 and an engagement member 31 facing the connection port 113. The engagement member 31 is movably arranged inside the first housing 1. In the locked state, the wireless charging module 2 is arranged with a cooperating portion matching the connection port 113. A top end of the engagement member 31 is engaged with the cooperating portion via the connection port 113. The second elastic member 32 is arranged between the locking structure 3 and the first housing 1, and the second elastic member 32 is configured to provide an elastic force to the engagement member 31 to maintain engagement with the cooperating portion. The trigger structure 4 is configured to be able to drive the top end of the engagement member 31 to disengage from the cooperating portion.

In the embodiments, the connection port 113 refers to a through-hole structure that penetrates the receiving groove 11 and the inner cavity of the housing. The through-hole structure may be rectangular, circular, or the like, and is configured to provide a channel for the engagement member 31 to contact the cooperating portion of the wireless charging module 2. The engagement member 31 refers to a locking component that can be adaptively locked with the cooperating portion, which may be specifically implemented using a metal or plastic buckle. The shape of the top end of the engagement member 31 and the cooperating portion form a complementary structure to achieve mechanical locking. The cooperating portion refers to a locking groove 22 or a snap-fit structure arranged on the wireless charging module 2, which may specifically be implemented using a locking groove 22 or an engagement boss. Its position is aligned with the connection port 113 to achieve precise engagement with the engagement member 31. The second elastic member 32 refers to an element that provides an elastic restoring force, which may be specifically a compression spring, torsion spring, tension spring, elastic rubber, or the like. The second elastic member 32 is arranged on a side of the engagement member 31 away from the connection port 113 to push against the engagement member 31. Therefore, the engagement member 31 is maintained in the locked state by the elastic force of the second elastic member 32. The elastic holding force of the second elastic member 32 and the driving stroke of the trigger structure 4 form a controllable mechanical balance, which not only ensures locking reliability but also ensures smoothness of the triggering operation. The elastic coefficient of the second elastic member 32 is required to enable balance of the locking holding force and the sensitivity of the triggering operation.

To facilitate the ejection and retraction of the wireless charging module 2, in practice, the cooperating portion is an engagement groove, and the top end of the engagement member 31 extends out of the connection port 113 to engage with the engagement groove. When the wireless charging module 2 is in the retracted state, the engagement member 31 passes through the connection port 113 under the elastic force of the second elastic member 32, and its top end forms a mechanical engagement with the cooperating portion of the wireless charging module 2, thereby restricting the wireless charging module 2 from flipping outward. By applying an external force to the trigger structure 4 (for example, the user manually triggers the trigger structure 4, or the trigger structure 4 is triggered by linkage with another module), the trigger structure 4 drives the engagement member 31 to overcome the elastic force of the second elastic member 32, causing the top end of the engagement member 31 to disengage from the cooperating portion. In this case, the wireless charging module 2 automatically ejects outward under the elastic force of the top elastic hinge. Mechanical locking between the engagement member 31 and the cooperating portion ensures the stability of the wireless charging module 2 in the retracted state. The driving operation of the trigger structure 4 on the engagement member 31 does not require direct contact with the surface of the wireless charging module, avoiding the risk of pinching the user's fingers. Moreover, the combination of the engagement member 31 and the second elastic member 32 simplifies the structural layout and reduces manufacturing costs.

Figure 3:
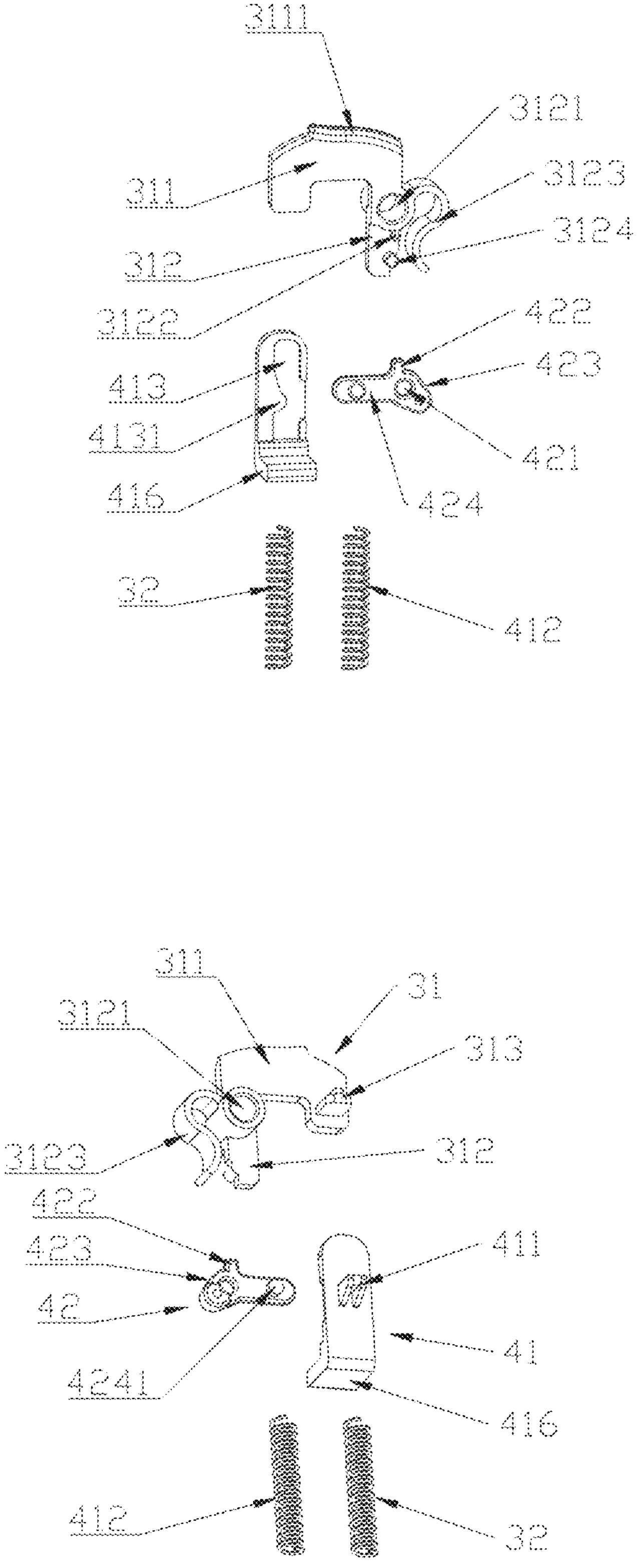
FIG. 3 is a schematic diagram of a buckle and a trigger piece of the present disclosure.
Figure 4:
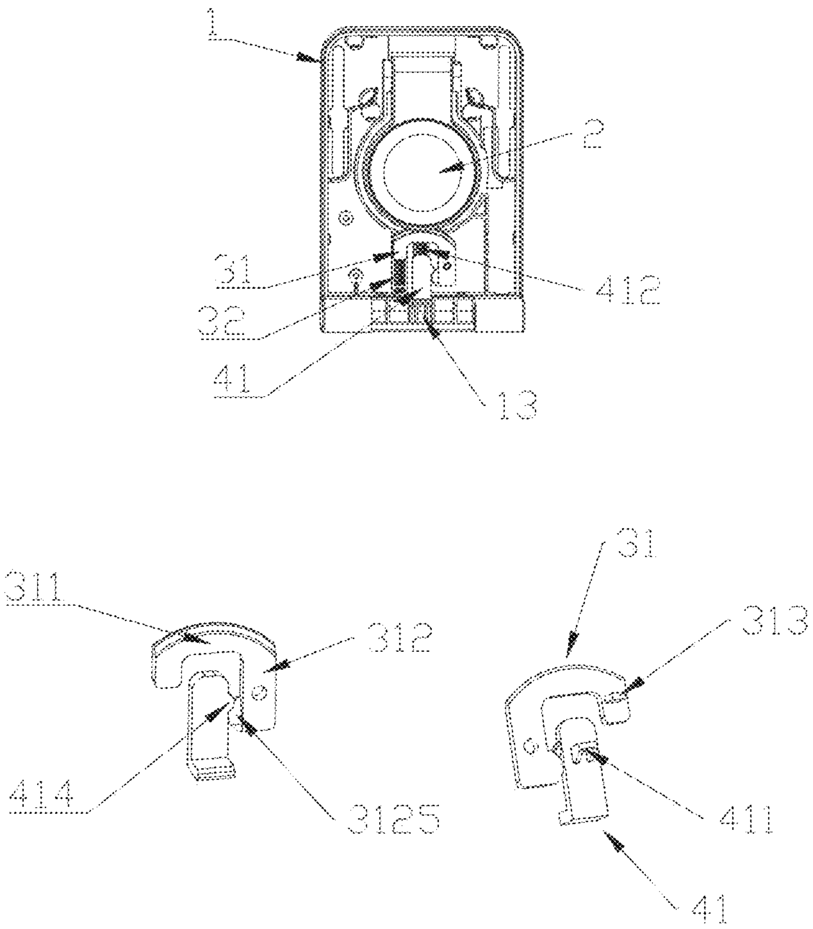
FIG. 4 is a schematic diagram of a second arc-shaped protrusion and a third arc-shaped protrusion of the present disclosure.

Further, as shown in FIGS. 2 to 4, an end of the engagement member 31 is rotatably connected to the first housing 1, and the other end of the engagement member 31 is elastically abutted against an inner wall of the first housing 1 through the second elastic member 32, such that the engagement member 31 has a tendency to rotate clockwise toward an outside of the connection port 113. The trigger structure 4 can drive the engagement member 31 to rotate counterclockwise toward an inside of the connection port 113, such that the top end of the engagement member 31 separates from the cooperating portion.

In the embodiments, that one end of the engagement member 31 is rotatably connected to the first housing 1 means that the engagement member 31 forms a rotation fulcrum with the first housing 1 through a hinge shaft, which may be specifically implemented using a pin shaft and shaft hole matching structure. This structure allows the engagement member 31 to rotate around the fulcrum, providing rotational degrees of freedom for the locking and unlocking actions of the engagement member 31. The second elastic member 32 applies an elastic force to the engagement member 31 to keep it in an engaged position engaged with the cooperating portion. The second elastic member 32 makes the engagement member 31 maintain a tendency to rotate toward the outside of the connection port 113 in its natural state through elastic force, ensuring the stability of the locked state. That the trigger structure 4 can drive the engagement member 31 to rotate counterclockwise means changing the movement direction of the engagement member 31 through mechanical linkage or pushing, which may be specifically implemented using a sliding push rod or a swing arm structure. This driving method can overcome the elastic force of the second elastic member 32, forcing the engagement member 31 to disengage from the cooperating portion, achieving the unlocking function.

Specifically, the engagement member 31 is connected to the first housing 1 through the rotation fulcrum. Under the elastic force of the second elastic member 32, the free end of the engagement member 31 continuously presses toward the outside of the connection port 113, keeping the top end of the engagement member 31 engaged with the cooperating portion of the wireless charging module 2. When the trigger structure 4 is operated, a reverse force is applied to drive the engagement member 31 to rotate counterclockwise, and the top end of the engagement member 31 disengages from the cooperating portion, releasing the limitation on the wireless charging module 2. In this case, the wireless charging module 2 is ejected outward under the action of its own elastic hinge structure. After the trigger ends, the elastic force of the second elastic member 32 pushes the engagement member 31 to reset clockwise, re-entering the locking preparation state.

This solution makes the engagement member 31 cooperate with the elastic structure through a rotary connection, such that the locking structure 3 can stably limit the wireless charging module 2 in its natural state, and the trigger structure 4 drives the engagement member 31 to disengage through mechanical linkage, achieving one-handed unlocking operation. This design not only avoids direct contact of the user with the edge of the wireless charging module 2 but also ensures locking reliability through elastic reset, such that the locked state is automatically maintained without additional locking steps, reducing operational complexity and improving ease of use and safety. In addition, the engagement member 31 switches between the unlocked and locked states by rotation, which simplifies the locking structure 3 compared to the sliding switching method, while improving the smoothness of switching between engagement and disengagement of the engagement member 31 and the cooperating portion, thereby avoiding accidental jamming.

The present disclosure further proposes a wireless charging structure with an automatically ejecting wireless charging module. The engagement member 31 includes an arc-shaped contact portion 311, the cooperating portion is a locking groove 22, and a top end of the arc-shaped contact portion 311 protrudes from the connection port 113 and elastically abuts in the locking groove 22.

In a specific embodiment, the wireless charging module 2 has an outer peripheral wall, the locking groove 22 is defined on the outer peripheral wall, and the locking groove 22 is arranged in an arc shape. The arc-shaped contact portion 311 refers to a terminal structure of the engagement member 31 having an arc-shaped contact surface matching the curvature of the inner wall of the locking groove 22. The arc-shaped contact portion 311 and the locking groove 22 are kept in contact by the continuous pressure applied by the second elastic member 32. Specifically, in the locked state, the arc-shaped surface of the arc-shaped contact portion 311 forms surface contact with the inner wall of the locking groove 22, and the elastic force provided by the second elastic member 32 makes the engagement member 31 continuously press against the locking groove 22. In this case, the wireless charging module 2 is limited in the receiving groove 11. When the trigger structure 4 drives the engagement member 31 to rotate counterclockwise, the arc-shaped contact portion 311 disengages from contact along the arc-shaped trajectory of the inner wall of the locking groove 22. In this case, the elastic force of the first elastic member 112 pushes the wireless charging module 2 to flip outward and eject. The design of the top end of the arc-shaped contact portion 311 protruding from the connection port 113 makes it completely embedded in the locking groove 22 in the locked state, avoiding accidental disengagement due to vibration or external impact.

Compared with the related art, where traditional locking structures mostly adopt a point contact method of a right-angle buckle and a planar engagement groove, which has a small contact area and is prone to stress concentration, the curved surface contact method of the arc-shaped contact portion 311 and the locking groove 22 of the present disclosure increases the effective contact area and disperses the contact stress to the entire arc-shaped area. In the related art, the engagement member needs to overcome a large static friction force when disengaging, while in the present disclosure, the motion trajectory of the arc-shaped structure is consistent with the tangential direction of the inner wall of the locking groove 22, which may effectively reduce the friction during the process of the engagement member 31 disengaging from the locking groove 22. Moreover, the motion trajectory of the arc-shaped contact portion 311 disengaging from the locking groove 22 is optimized, reducing the driving force required by the trigger structure 4, while avoiding scratches and wear on the contact surfaces.

Furthermore, as shown in FIG. 1, FIG. 3, FIG. 9, and FIG. 10, a guiding inclined surface 3111 is arranged on the top of the front side of the arc-shaped contact portion 311, and/or an avoidance inclined surface 23 is arranged on a connection between the bottom surface and the peripheral wall surface of the wireless charging module 2 corresponding to the arc-shaped contact portion 311.

Herein, the guiding inclined surface 3111 refers to an inclined surface arranged on the top end of the arc-shaped contact portion 311, which may be specifically implemented by an inclined surface structure forming an angle of 15° to 50° with the top surface of the arc-shaped contact portion 311. During the process of the wireless charging module 2 being retracted into the receiving groove 11, the guiding inclined surface 3111 forms sliding contact with the bottom surface of the wireless charging module 2, to gradually push the arc-shaped contact portion 311 toward the inside of the connection port 113. When the arc-shaped contact portion 311 slides to correspond to the locking groove 22, the arc-shaped contact portion 311 is pushed outward by the action of the second elastic member 32 to cooperate with the locking groove 22.

The avoidance inclined surface 23 refers to a chamfered structure arranged on an edge of the bottom surface of the wireless charging module 2, which may be specifically implemented by a chamfer of 45° to 80° or an arc transition structure. This inclined surface forms a contact guiding surface with the engagement member 31 when the wireless charging module 2 is retracted. When the wireless charging module 2 is pressed into the receiving groove 11, the avoidance inclined surface 23 first contacts the engagement member 31, and is guided by the guiding inclined surface 3111 to force the engagement member 31 to produce a counterclockwise rotational displacement until the wireless charging module 2 completely enters a locked position, and then the engagement member 31 resets and snaps into the locking groove 22 under the action of elastic force. By providing the guiding inclined surface 3111 and the avoidance inclined surface 23, the retraction resistance of the wireless charging module 2 may be effectively reduced, and the smoothness of retraction of the wireless charging module 2 may be improved. The guiding inclined surface 3111 and the avoidance inclined surface 23 may be implemented separately or combined to form a double guiding mechanism, thereby solving the problem of motion jamming caused by friction on the contact surfaces between the locking structure 3 and the wireless charging module 2, and improving the smoothness of resetting the wireless charging module 2.

In some embodiments, referring to FIGS. 2 to 4, a first limiting block 313 is arranged on a back side of the bottom of the arc-shaped contact portion 311 near the second elastic member 32. A first limiting groove 12 is defined inside the first housing 1. The first limiting block 313 is swingably inserted through the first limiting groove 12. The second elastic member 32 is a tension spring. The second elastic member 32 is arranged in the first limiting groove 12. Two ends of the second elastic member 32 elastically abut against the bottom of the first limiting groove 12 and the bottom of the first limiting block 313, respectively. When an external force drives the engagement member 31 (e.g., a buckle herein) to rotate counterclockwise around the first hinge portion 3121 of the swing arm 312, the arc-shaped contact portion 311 will swing in the counterclockwise direction. In this case, the first limiting block 313 will compress the second elastic member 32. When the external force disappears, the arc-shaped contact portion 311 will swing in the clockwise direction under the action of the second elastic member 32 and re-abut in the locking groove 22. By providing the first limiting groove 12, the swing range of the arc-shaped contact portion 311 may be limited, thereby making the structure more stable.

In some embodiments, as shown in FIGS. 1 to 4, the locking structure 3 includes a buckle 31 arranged inside the first housing 1 and a second elastic member 32 connected to the buckle 31. A right side of the buckle 31 is hinged inside the first housing 1. The second elastic member 32 has a tendency to make the buckle 31 rotate clockwise around the hinge position. A connection port 113 connected to the inside of the first housing 1 is defined on a bottom end of the receiving groove 11. A locking groove 22 corresponding to the position of the connection port 113 is defined on a bottom end of the wireless charging module 2. A top end of the buckle 31 passes through the connection port 113 and elastically abuts in the locking groove 22. Specifically, the buckle 31 includes an arc-shaped contact portion 311. A swing arm 312 is integrally connected to a bottom of a right side of the arc-shaped contact portion 311. A first hinge portion 3121 is arranged on the swing arm 312. The first hinge portion 3121 is hinged on an inner wall of the first housing 1. Under the action of the second elastic member 32, the buckle 31 has a tendency to rotate clockwise around the first hinge portion 3121 of the swing arm 312, such that a top end of the arc-shaped contact portion 311 passes through the connection port 113 and elastically abuts in the locking groove 22. When the top end of the arc-shaped contact portion 311 abuts in the locking groove 22, the wireless charging module 2 cannot flip outward from the receiving groove 11, achieving the effect of retraction and locking. When an external force drives the buckle 31 to rotate counterclockwise around the first hinge portion 3121 of the swing arm 312, the arc-shaped contact portion 311 will swing in the counterclockwise direction and disengage from the locking groove 22. In this case, the wireless charging module 2 is in an unlocked state and flips out of the receiving groove 11 under the action of the first elastic member 112, and the user can charge the electronic device such as watches.

In some embodiments, as shown in FIGS. 2 and 3, the trigger structure 4 includes a trigger piece 41 and a driving member 42. The driving member 42 is rotatably connected to the engagement member 31. The trigger piece 41 is slidably arranged in the first housing 1 along the opening direction of the connection port 113, for driving the driving member 42 to link the engagement member 31 to rotate and disengage from the cooperating portion.

In the embodiments, the trigger piece 41 refers to an operating component that can slide along the opening direction of the connection port 113, which may be specifically implemented in the form of a slider or a push button. Specifically, a second limiting block is arranged in the middle of a back of the trigger piece 41. A second limiting groove 14 extending along the opening direction of the connection port 113 is defined inside the first housing 1. The second limiting block is slidably arranged in the second limiting groove 14. The second elastic member 32 is arranged in the second limiting groove 14.

The driving member 42 refers to an intermediate component that can transmit motion, which may be specifically implemented using a connecting rod or swing arm structure, converting the linear motion of the trigger piece 41 into the rotational motion of the engagement member 31 through rotation. The rotatable connection of the engagement member 31 means that a hinge or shaft-hole fitting method is adopted between the driving member 42 and the engagement member 31, allowing the two to rotate relative to each other in a specific plane, thereby achieving force transmission and direction conversion.

Specifically, during the sliding process, the trigger piece 41 pushes the driving member 42 to rotate around a hinge point. The driving member 42 drives the engagement member 31 to deflect counterclockwise around its own rotation axis through rotation, causing the top end of the engagement member 31 to disengage from the cooperating portion of the wireless charging module 2. The sliding stroke of the trigger piece 41 is designed to match the required rotation angle of the engagement member 31, ensuring the accuracy of the unlocking action. When the trigger piece 41 resets, the driving member 42 rotates back as it slides in the opposite direction, and the engagement member 31 resets clockwise to the locked position under the action of the second elastic member 32.

In the related art, traditional unlocking mechanisms mostly use methods of directly pressing the engagement member 31 or toggling a latch. The operation direction coincides with the unlocking direction, which easily leads to accidental triggering, and the manual force required is relatively large. In comparison, the proposed solution in the present disclosure separates the operation direction from the unlocking action through the linkage design of the trigger piece 41 and the driving member 42, uses the lever principle to reduce the operation force, and simultaneously controls the rotation angle through the sliding stroke, thereby avoiding problems of incomplete unlocking or over-travel. Through the above technical solution, the present disclosure may achieve the operational convenience of unlocking by sliding, reducing the user's force requirement. In addition, the precise transmission path through mechanical linkage reduces the risk of unlocking failure. The separate design of the trigger piece 41 and the driving member 42 makes the structural layout more compact, avoids motion interference, and ensures stable switching of the engagement member 31 between the locked and unlocked states.

Further, as shown in FIGS. 2 and 3, an end of the engagement member 31 away from the second elastic member 32 is arranged with a swing arm 312. A first hinge portion 3121 is arranged on the swing arm 312, and a second hinge portion 421 is arranged on a side of the first hinge portion 3121 away from the connection port 113. The first hinge portion 3121 is hinged to the inner wall of the first housing 1. The driving member 42 is hinged to the second hinge portion 421. The driving member 42 and the swing arm 312 are in limiting cooperation in the clockwise rotation direction of the engagement member 31, and the driving member 42 can rotate relative to the swing arm 312 in the counterclockwise rotation direction of the engagement member 31. When the trigger piece 41 slides toward a side close to the connection port 113, the driving member 42 is driven to link the engagement member 31 to rotate counterclockwise to the unlocked position. When the trigger piece 41 slides toward a side away from the connection port 113, the engagement member 31 can rotate clockwise to the locked position under the action of the second elastic member 32.

The swing arm 312 refers to a rigid connecting rod structure connecting the engagement member 31 and the driving member 42, which may be specifically implemented using a metal stamped part or a plastic molded part. The swing arm 312 uses the first hinge portion 3121 as a rotation fulcrum and the second hinge portion 421 as a transmission node of the driving force. The first hinge portion 3121 refers to a pivot connection point between the swing arm 312 and the inner wall of the housing, which may be specifically implemented using a shaft-hole fitting structure. For example, a through-hole is defined in the middle of the swing arm 312, and a second hinge shaft 114 is arranged inside the first housing 1 and movably inserted through the through-hole. The second hinge shaft 114 is arranged in a direction perpendicular to the inner wall of the first housing 1. The second hinge portion 421 refers to a movable connection point between the swing arm 312 and the driving member 42, allowing the driving member 42 to rotate relative to the swing arm 312 in a specific direction. The second hinge portion 421 may be specifically implemented using a shaft-hole fitting structure. For example, a third hinge shaft 3124 is arranged on a bottom end of the swing arm 312. The third hinge shaft 3124 is arranged in a direction perpendicular to the inner wall of the first housing 1. A through-hole is defined on the driving member 42, and the third hinge shaft 3124 is movably inserted in the second hinge portion 421 to achieve movable connection between the driving member 42 and the swing arm 312. That the driving member 42 and the swing arm 312 are in limiting cooperation in the clockwise rotation direction of the engagement member 31 means that the driving member 42 and the swing arm 312 have a mechanical blocking structure in the clockwise rotation direction, which may be specifically implemented using a convex-concave engagement design, thereby limiting the relative rotation of the two in the clockwise direction of the engagement member 31.

Specifically, when the trigger piece 41 slides toward the connection port 113, the driving member 42 is subjected to a pushing force and rotates clockwise around the second hinge portion 421. Because the driving member 42 and the swing arm 312 are limited in the clockwise direction, the driving member 42 can drive the entire swing arm 312 to rotate counterclockwise around the first hinge portion 3121, forcing the engagement member 31 to disengage from the locked position. During this process, the second elastic member 32 is compressed to store energy. When the trigger piece 41 slides in the opposite direction, the second elastic member 32 releases the elastic force to push the engagement member 31 to rotate clockwise and reset. In this case, the driving member 42 can rotate freely relative to the swing arm 312 to avoid motion interference. The dual-hinge structure of the swing arm 312 converts linear sliding into precise rotational control. The first hinge portion 3121 acts as a fulcrum to form a leverage effect, reducing the force required for the triggering operation. The unidirectional limitation between the driving member 42 and the swing arm 312 ensures forced linkage during the unlocking action, while the relative rotation of the two during the reset process avoids structural jamming.

In the related art, traditional locking mechanisms mostly use a single hinge point combined with a spring reset, which has problems of imprecise unlocking stroke control and easy jamming during reset. In comparison, the proposed solution of the present disclosure may decompose the driving path into two stages, i.e., rigid transmission and elastic reset, through the dual-hinge structure of the swing arm 312. During unlocking, a rigid lever transmission is formed to ensure action reliability. During reset, an interference-free reset is achieved through the synergistic effect of the elastic member and the movable hinge.

Through the above technical solution, the present disclosure may achieve stable unlocking and automatic reset functions of the engagement member 31 under triggering operation. The dual-hinge structure of the swing arm 312 converts linear driving force into precise rotational control, ensuring the consistency of the angle at which the engagement member 31 disengages from the locked position. The unidirectional limiting cooperation between the driving member 42 and the swing arm 312 avoids unlocking failure caused by mis-operation, while the synergistic effect of the elastic reset mechanism and the movable hinge ensures the smoothness of restoring the locked state. This design, through the combined application of mechanical limitation and elastic elements, may effectively improve the working reliability of the locking mechanism while reducing the operation force.

Further, a second sliding groove 413 is defined on a side of the trigger piece 41 facing the driving member 42. A first arc-shaped protrusion 4131 protrudes from the middle of a bottom wall of the second sliding groove 413 toward the driving member 42. A top wall of the first arc-shaped protrusion 4131 smoothly transitions to the bottom wall of the second sliding groove 413.

The driving member 42 includes a driving arm. When the trigger piece 41 moves to a position where a top surface of the first arc-shaped protrusion 4131 abuts against the driving arm, the engagement member 31 is driven to rotate clockwise to disengage from the cooperating portion. When an end of the driving arm slidably abuts against the bottom wall of the second sliding groove 413 on either side of the first arc-shaped protrusion 4131, the engagement member 31 is located at a locked position where it can be engaged with the cooperating portion.

In the embodiments, the second sliding groove 413 is configured to limit the movement trajectory of the driving arm and may be implemented as a linear or curved channel. Generally, for ease of operation, the second sliding groove 413 is a linear channel extending along the opening direction of the connection port 113. The first arc-shaped protrusion 4131 refers to an arc-shaped protrusion located in the middle of the bottom wall of the second sliding groove 413, for guiding the sliding direction of the driving arm.

Specifically, when the trigger piece 41 moves toward a side close to the connection port 113, the top surface of the first arc-shaped protrusion 4131 in the second sliding groove 413 contacts the driving arm, forcing the driving arm to lift along the curved surface of the first arc-shaped protrusion 4131. In this case, the driving arm drives the engagement member 31 to rotate counterclockwise around the hinge point, causing the top end of the engagement member 31 to disengage from the cooperating portion to complete unlocking. When the trigger piece 41 moves in the opposite direction through the third elastic member 412, the end of the driving arm slides to an area of the bottom wall of the second sliding groove 413, and the driving arm is released from the limiting constraint with the trigger piece 41. The engagement member 31 rotates clockwise under the action of the second elastic member 32, causing its top end to engage with the cooperating portion and enter the locked state. The smooth transition design between the first arc-shaped protrusion 4131 and the bottom wall of the second sliding groove 413 may reduce the frictional resistance during the sliding of the driving arm, avoiding motion jamming. This solution, through the path constraint of the second sliding groove 413 and the first arc-shaped protrusion 4131, precisely controls the motion trajectory of the driving arm, thereby solving the problem of action jamming when the trigger structure 4 is linked with the locking structure 3, and ensuring the smooth movement of the engagement member 31 during the switching between the unlocked and locked states.

Furthermore, referring to FIG. 2 and FIG. 3, a side of the swing arm 312 near the driving arm at the first hinge portion 3121 protrudes with a first stopper. The driving member 42 protrudes with a second stopper corresponding to the first stopper. The first stopper and the second stopper are in limiting cooperation in the clockwise rotation direction of the engagement member 31.

In the embodiments, the first stopper refers to a protruding structure fixed on the swing arm 312, which may be specifically implemented by a limiting block integrally formed with the swing arm 312. The second stopper refers to a protruding structure fixed on the driving member 42, which may be specifically implemented by a limiting block integrally formed with the driving member 42.

Specifically, when the trigger piece 41 slides close to the connection port 113, the driving member 42 is subjected to a pushing force and rotates clockwise around the second hinge portion 421. Since the first stopper on the swing arm 312 and the second stopper on the driving member 42 abut against each other, forming a rigid limitation on the rotation angle, the driving member 42 can drive the entire swing arm 312 to rotate counterclockwise around the first hinge portion 3121, forcing the engagement member 31 to disengage from the locked position. When the trigger piece 41 slides in the opposite direction, the second elastic member 32 releases the elastic force to push the engagement member 31 to rotate clockwise and reset. In this case, the driving member 42 can rotate counterclockwise freely relative to the swing arm 312, and the contact surfaces between the first stopper and the second stopper separate, which may avoid interference with the rotation of the engagement member 31, ensuring smooth unlocking process. This solution may achieve precise control of the rotation angle of the engagement member 31 through the unidirectional rigid rotational limit between the stoppers, thereby eliminating the impact of elastic member deformation on locking stability, and avoiding mechanical interference caused by excessive rotation.

Furthermore, as shown in FIG. 3, an arc-shaped elastic arm is arranged on a side of the swing arm 312 away from the trigger piece 41. A cam is arranged on a side of the driving member 42 facing away from the trigger piece 41. A free end of the arc-shaped elastic arm abuts against the curved surface of the cam. Under the action of the arc-shaped elastic arm, the driving member 42 has a tendency to rotate clockwise around the second hinge portion 421.

In the embodiments, the arc-shaped elastic arm is configured to provide an elastic restoring force after elastic deformation, such that it drives the driving member 42 to rotate clockwise around the second hinge portion 421 to the initial position through the elastic force. The arc-shaped elastic arm may be specifically an elastically deformable arc-shaped arm structure made of materials such as metal or plastic.

Specifically, when the trigger piece 41 slides close to the connection port 113, the driving member 42 is subjected to a pushing force and rotates clockwise around the second hinge portion 421, driving the swing arm 312 to rotate counterclockwise while pressing against the arc-shaped elastic arm through the cam, causing the arc-shaped elastic arm to deform elastically. When the trigger piece 41 slides in the opposite direction, the second elastic member 32 releases the elastic force to push the engagement member 31 to rotate clockwise and reset. In this case, the elastic restoring force of the arc-shaped elastic arm drives the driving member 42 to rotate clockwise to the initial position through the cam. This solution may make the swing arm 312 and the driving member 42 cooperate through the arc-shaped elastic arm and the cam, such that the engagement member 31 can drive the driving member 42 to return to the initial position while resetting to the locked position, without the need for an additional spring to reset the driving member 42, which may reduce the number of parts and make the elastic reset more reliable.

In some embodiments, as shown in FIGS. 1, 8 to 14, the trigger structure 4 includes a trigger piece 41. A first sliding groove 13 is defined inside the first housing 1. The trigger piece 41 is movably arranged in the first sliding groove 13. A connection arm 416 protrudes from a front side of an end of the trigger piece 41 away from the wireless charging module 2. The first housing 1 further defines a travel notch 115 corresponding to the connection arm 416, and the travel notch 115 communicates with the first sliding groove 13. The connection arm 416 is exposed outside the first housing 1 through the travel notch 115.

In the embodiments, the trigger piece 41 refers to an operating component that can slide along the opening direction of the connection port 113, which may be specifically implemented in the form of a slider or a push button. The second limiting groove 14 is configured to limit the movement trajectory of the trigger piece 41, which may be implemented as a linear or curved channel. Generally, for ease of operation, the second limiting groove 14 is a linear channel extending along the opening direction of the connection port 113. The connection arm 416 may be a protrusion, a bar-shaped block structure, etc. The travel notch 115 is configured for the connection arm 416 to extend out and provides moving space for the reciprocating movement of the connection arm 416. In addition, end walls of the travel notch 115 may limit the extreme moving positions of the connection arm 416. The shape of the travel notch 115 may be various, for example, the travel notch 115 may be rectangular, circular, elliptical, etc., which is not specifically limited here.

The connection arm 416 is exposed outside the first housing 1 through the travel notch 115, in this way, when the wireless charging module 2 is required to be used, the user can push the trigger piece 41 through the exposed connection arm 416. The trigger piece 41 drives the engagement member 31 to rotate counterclockwise, causing the top end of the engagement member 31 to disengage from the cooperating portion. Under the action of the elastic hinge, the wireless charging module 2 automatically ejects from the receiving groove 11. When not in use, the wireless charging module 2 can be pressed into the receiving groove 11, and the engagement member 31 automatically engages with the cooperating portion under the action of the second elastic member 32 to achieve locking. This solution may simplify the operation steps and improve the user experience through the limiting design of the travel notch 115 and the exposed connection arm 416. The overall solution not only ensures the reliability of locking but also ensures the convenience and precision of the unlocking operation, thereby effectively solving the problems of unstable locking state and unreliable unlocking operation in the related art.

In some embodiments, a third elastic member 412 is arranged in the first sliding groove 13. The third elastic member 412 is clamped between the inner wall of the first housing 1 and an end of the trigger piece 41 facing the connection port 113, such that under the action of the third elastic member 412, the trigger piece 41 has a tendency to slide toward the side away from the connection port 113.

In the embodiments, the third elastic member 412 may be an elastic member such as a compression spring or elastic rubber. The fixing method of the third elastic member 412 includes but is not limited to snapping into a housing groove (i.e., the first sliding groove 13), inserting through a limiting post, etc. Specifically, when the wireless charging module 2 is in the locked state, the third elastic member 412 is in a naturally extended or slightly compressed state. When the user applies an external force to push the trigger piece 41 to slide in the direction of the connection port 113, an end of the trigger piece 41 compresses the third elastic member 412, causing it to further produce linear compression deformation. When the external force is released, the third elastic member 412 releases the elastic potential energy, pushing the trigger piece 41 to slide in the opposite direction and reset, achieving the automatic reset function of the trigger structure 4. Since the trigger piece 41 can reset automatically, the engagement member 31 can also quickly return to the locked position under the action of the second elastic member 32, thereby improving user convenience.

In other embodiments, referring to FIG. 4, an end of the engagement member 31 away from the second elastic member 32 is arranged with a swing arm 312. The trigger piece 41 protrudes with a second arc-shaped protrusion 414. A third arc-shaped protrusion 3125 is arranged on the swing arm 312 in the movement path of the second arc-shaped protrusion 414. When the trigger piece 41 slides toward a side close to the connection port 113 until the first arc-shaped protrusion 4131 abuts against a top of the second arc-shaped protrusion 414, the engagement member 31 is pushed to rotate counterclockwise to the unlocked position. When the trigger piece 41 slides toward a side away from the connection port 113 until the first arc-shaped protrusion 4131 and the top of the second arc-shaped protrusion 414 separate from each other, the engagement member 31 can rotate clockwise to the locked position under the action of the second elastic member 32.

In the embodiments, the second arc-shaped protrusion 414 and the third arc-shaped protrusion 3125 may be made of wear-resistant plastic material. The arc-shaped surfaces of the second arc-shaped protrusion 414 and the third arc-shaped protrusion 3125 can be polished to reduce friction. The second arc-shaped protrusion 414 may be constructed as a convex arc guiding surface with continuous curvature, and the third arc-shaped protrusion 3125 correspondingly forms a cooperating convex arc surface structure. When the trigger piece 41 slides towards the connection port 113, the second arc-shaped protrusion 414 slides along the guiding surface of the third arc-shaped protrusion 3125. The tangential component force at the contact point of the two protrusions forms a continuous pushing torque, pushing the swing arm 312 gradually away from the trigger piece 41. During this process, the swing arm 312 converts linear displacement into rotational motion, and its rotation angle is precisely controlled by the change in the position of the arc-shaped contact point. When the second arc-shaped protrusion 414 moves to the vertex of the third arc-shaped protrusion 3125, the engagement member 31 reaches the maximum rotation angle, and in this case, the cooperating portion completely disengages. In the reset stage, the swing arm 312 produces a clockwise torque through the restoring force of the second elastic member 32, and the trigger piece 41 resets through the elastic member and the pushing force of the swing arm 312.

The present disclosure may improve the transmission stability and precision between the trigger piece 41 and the engagement member 31 by providing the swing arm 312 on the engagement member 31 and providing the arc-shaped protrusions on the swing arm 312 and the trigger piece 41 respectively, forming a stable sliding contact surface. Continuous abutment between the arc-shaped protrusions generates a smooth pushing force, ensuring that the rotational action of the engagement member 31 is smooth and reliable. In addition, the sliding contact of the arc-shaped surfaces reduces the resistance during the rotation of the engagement member 31, thereby improving the smoothness of the unlocking and locking actions. In addition, the provision of the second elastic member 32 ensures that the engagement member 31 can promptly reset to the locked position, avoiding the problem of the engagement member 31 staying due to inertia or friction. These improvements work together to effectively solve the problems of unstable transmission and imprecise action between the engagement member 31 and the trigger piece 41, thereby improving the reliability and stability of the ejection of the wireless charging module 2.

In some of the above schemes of the present disclosure, a solution is proposed where the sliding trigger piece 41 drives the engagement member 31 to rotate counterclockwise to achieve unlocking. However, in this scheme, the trigger piece 41 needs to slide in the second limiting groove 14, resulting in a long operation stroke and requiring the user to precisely control the sliding position, which is not convenient enough for operation.

Figure 5:
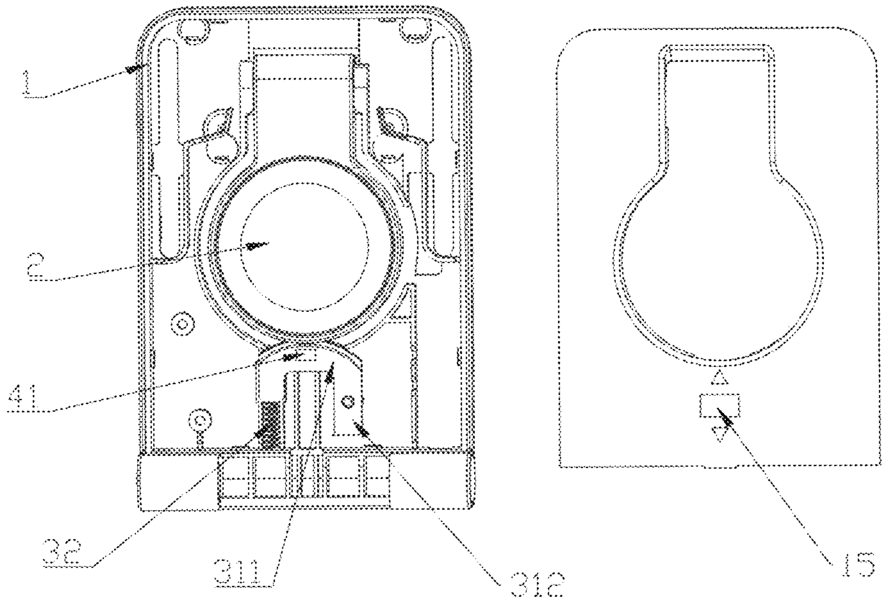
FIG. 5 is a schematic diagram of a trigger piece capable of moving up and down according to the present disclosure.
Figure 6:
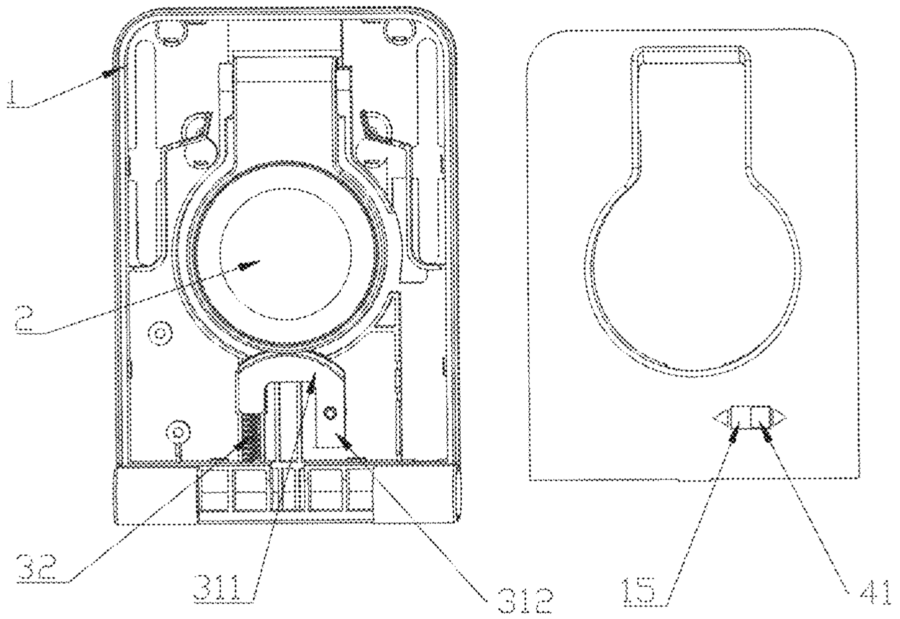
FIG. 6 is a schematic diagram of a trigger piece capable of moving left and right according to the present disclosure.

In this regard, as shown in FIG. 5 and FIG. 6, the present disclosure further proposes that the trigger structure 4 includes a trigger piece 41. The trigger piece 41 may be a toggle button on the engagement member 31. A toggle groove 15 is defined on a front surface of the first housing 1. An end of a front side of the trigger piece 41 is fixed on the arc-shaped contact portion 311, and an end of a back side of the trigger piece 41 is movably inserted through the toggle groove 15, such that when an external force toggles the toggle button, the engagement member 31 is driven to rotate counterclockwise.

The movement direction of the trigger piece 41 may be designed according to its specific position on the engagement member 31.

For example, as shown in FIG. 5, in an example, the trigger piece 41 is a toggle button arranged in the middle of the arc-shaped contact portion 311 or on a side close to the second elastic member 32. An end of the front side of the trigger piece 41 is fixed on the arc-shaped contact portion 311, and an end of the back side of the trigger piece 41 is movably inserted through the toggle groove 15 in a vertically movable manner.

During use, the user toggles the trigger piece 41 downward in the toggle groove 15. The trigger piece 41 moves from the top to the bottom inside the toggle groove 15. In this case, the trigger piece 41 pushes the engagement member 31 to rotate counterclockwise around the first hinge portion 3121 of the swing arm 312, driving the arc-shaped contact portion 311 to disengage from the cooperating portion of the wireless charging module 2, unlocking the wireless charging module 2, and causing it to automatically eject from the receiving groove 11. In this case, the second elastic member 32 deforms and stores elastic potential energy. When the user stops toggling, after the external force is released, the second elastic member 32 releases the stored energy, pushing the engagement member 31 to rotate clockwise back, driving the toggle button to return to the initial position along the toggle groove 15.

For example, as shown in FIG. 6, in another example, an end of the trigger piece 41 away from the toggle groove 15 is arranged on a top of the arc-shaped contact portion 311 away from the second elastic member 32 (for example, outside the top of the right side of the arc-shaped contact portion 311 or abutting the top of the right side edge of the arc-shaped contact portion 311).

During use, the user can push the engagement member 31 to rotate counterclockwise around the first hinge portion 3121 of the swing arm 312 by toggling the trigger piece 41 in the toggle groove 15 to the left, driving the arc-shaped contact portion 311 to disengage from the cooperating portion of the wireless charging module 2, unlocking the wireless charging module 2, and causing it to automatically eject from the receiving groove 11.

By arranging the trigger piece 41 on the engagement member 31, the lever arm length of the trigger piece 41 can be shortened. This solution converts the vertical movement of the toggle button into the rotational movement of the engagement member 31 through the arc-shaped contact portion 311, which may shorten the operation stroke, eliminate the risk of sliding deviation, improve operation convenience, and achieve the simplification and reliability improvement of the trigger structure 4 operation.

Figure 7:
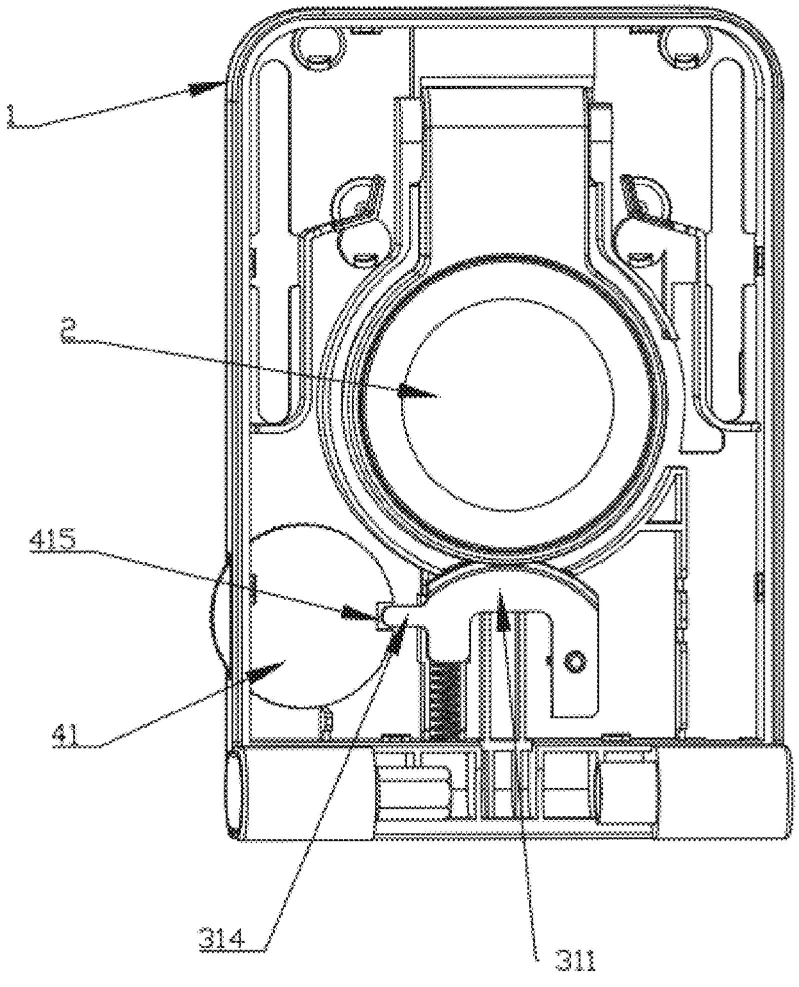
FIG. 7 is a schematic diagram of a knob-type trigger piece of the present disclosure.
Figure 8:
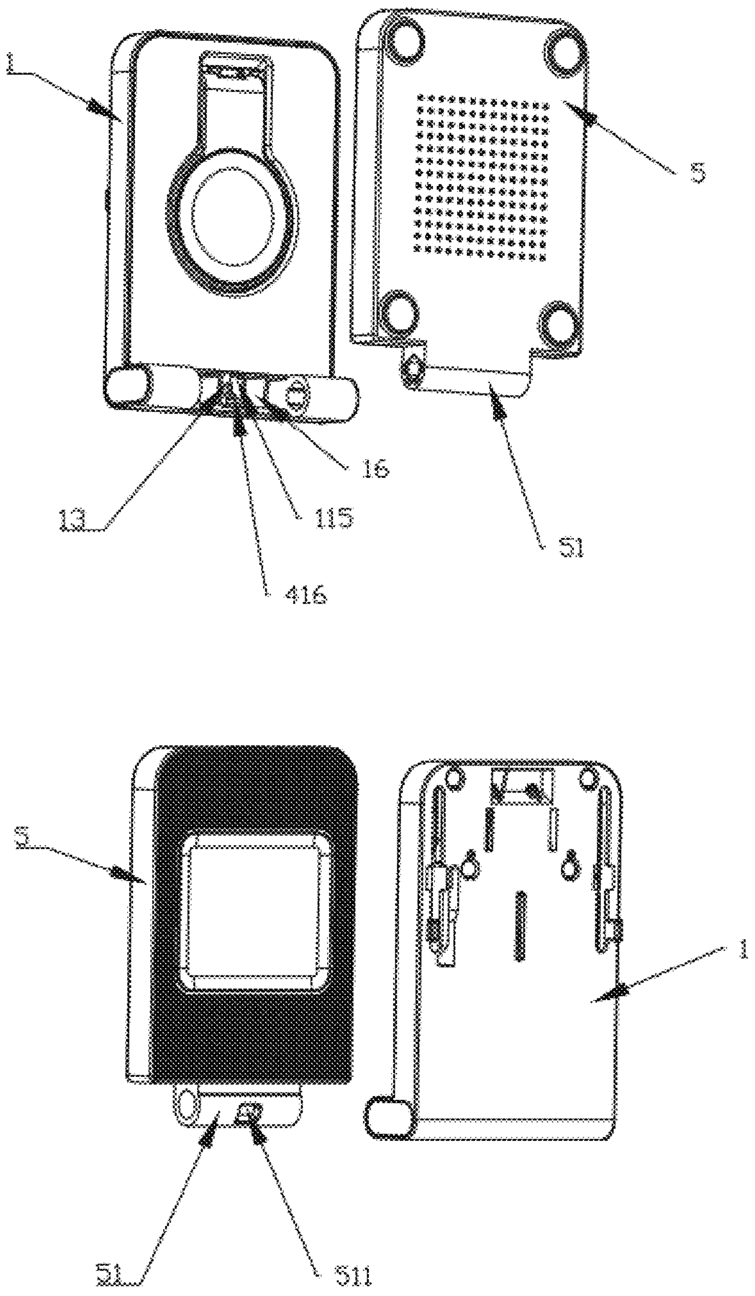
FIG. 8 is a schematic structural diagram of a charger according to a first implementation of the present disclosure.
Figure 9:
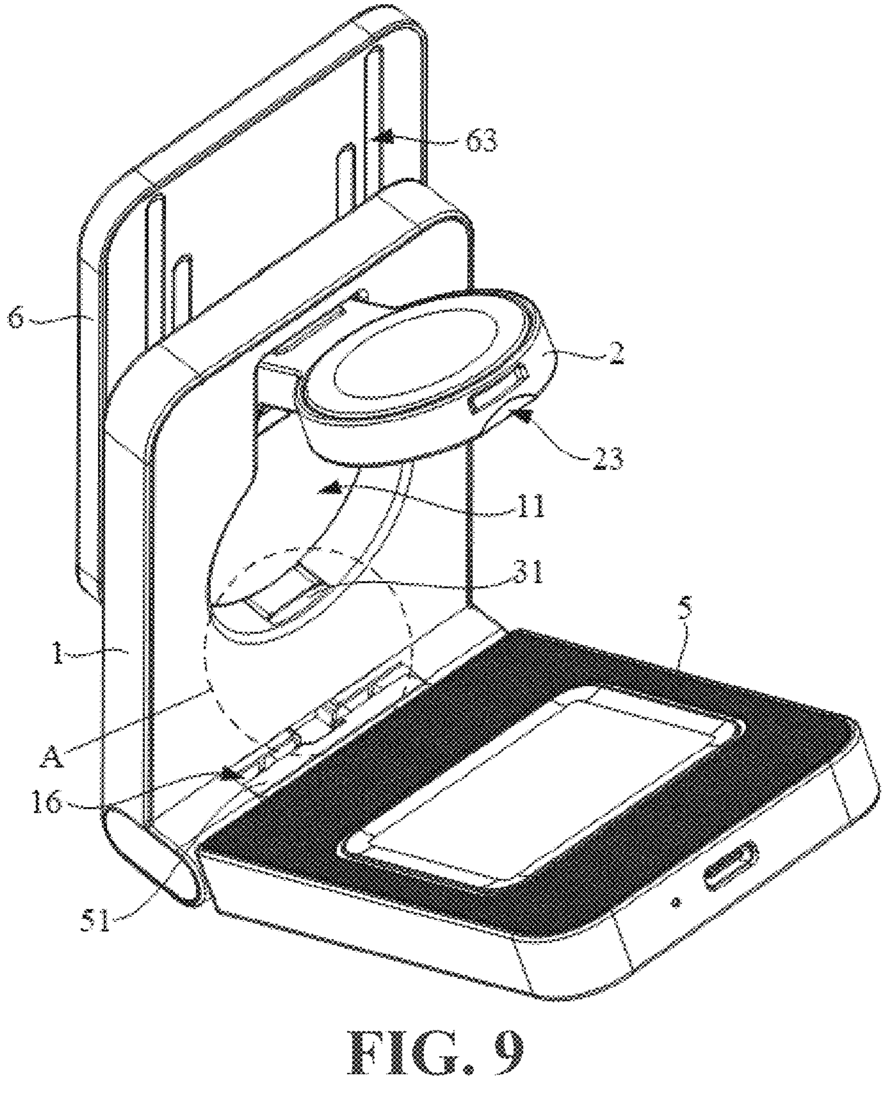
FIG. 9 is a schematic structural diagram of a charger according to a second implementation of the present disclosure.
Figure 10:
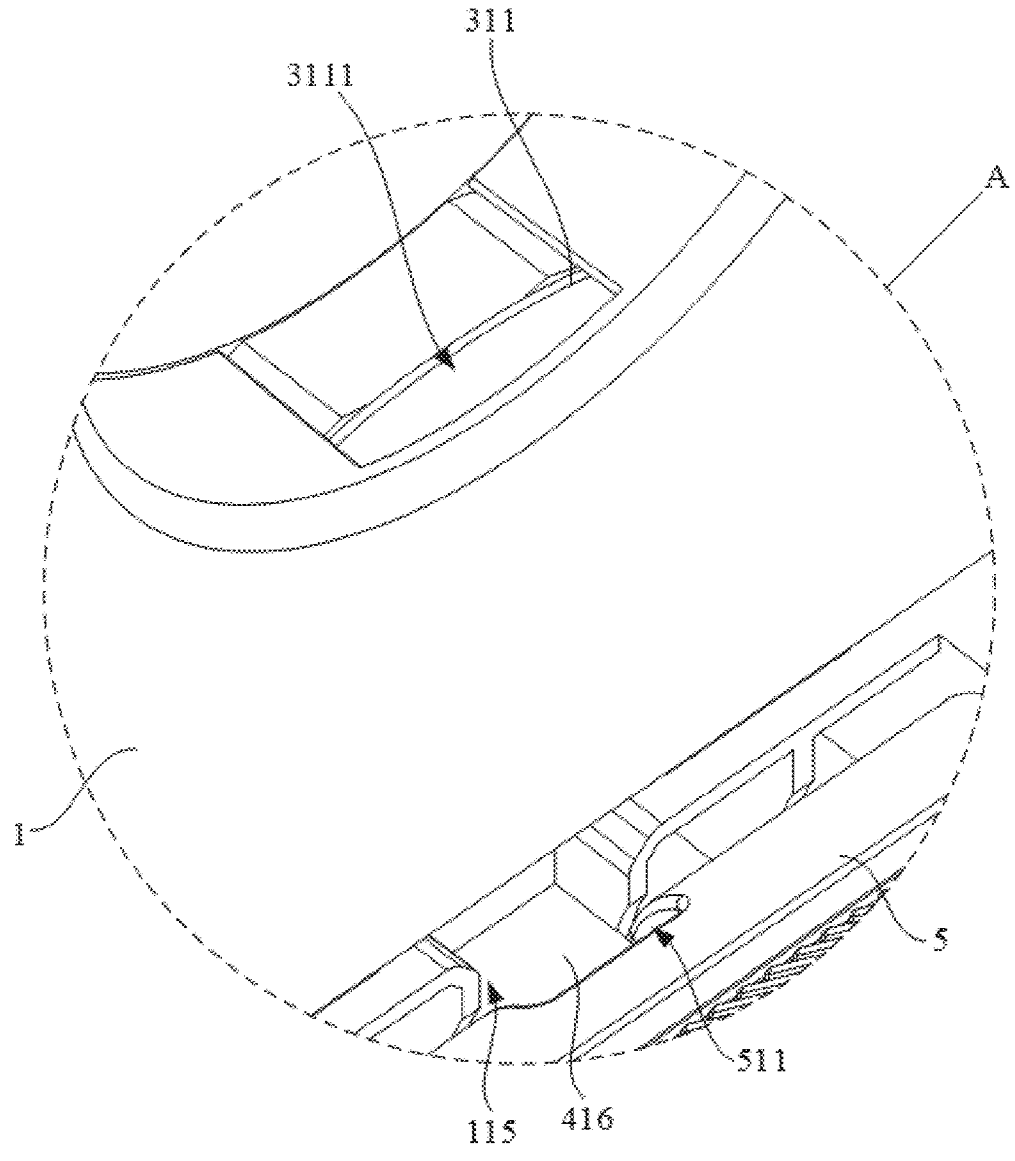
FIG. 10 is a partial enlarged view of area A circumscribed in FIG. 9.

In other embodiments, as shown in FIG. 7, the trigger structure 4 includes a trigger piece 41. The trigger piece 41 is a knob rotatably arranged in the first housing 1. A side of the trigger piece 41 away from the engagement member 31 extends outward through the first housing 1 and is exposed. One of a side of the trigger piece 41 opposite the engagement member 31 and the engagement member 31 defines an engagement groove, and the other of the side of the trigger piece 41 and the engagement member 31 is arranged with a toggle rod. The toggle rod is swingably inserted through the engagement groove, such that when the trigger piece 41 rotates, the engagement member 31 is driven to switch between the open position and the locked position.

In the embodiments, a side of the knob away from the engagement member 31 extends outward through the first housing 1 and is exposed, facilitating the user's rotation and toggling operation. The rotation axis of the knob may be set along the thickness direction of the first housing 1. When the user rotates the exposed knob, the knob drives the engagement member 31 to rotate through the cooperation of the engagement groove and the toggle rod. During use, the user rotates the trigger piece 41 counterclockwise. In some embodiments, an inner wall of the engagement groove 415 pushes the toggle rod 314 to drive the buckle 31 to rotate counterclockwise around the first hinge portion 3121 of the swing arm 312. When the knob rotates to the maximum angle, the engagement member 31 just completes switching from the locked position to the unlocked position. In this case, the arc-shaped contact portion 311 disengages from the locking groove 22. The wireless charging module 2 automatically ejects under the action of the elastic hinge, and the wireless charging module 2 is in the unlocked state. When the knob returns, the elastic force of the second elastic member 32 pushes the engagement member 31 to reset, simultaneously driving the knob to rotate in the opposite direction to the initial position. This structure replaces linear sliding with rotational movement, which may reduce the operation space and make the triggering more flexible.

The present disclosure further proposes a charger. Referring to FIGS. 8 to 33, the charger includes a wireless charging structure with an automatically ejecting wireless charging module. The specific structure of the wireless charging structure may refer to the above embodiments. A bottom of the first housing 1 is hinged with a second housing 5. The trigger structure 4 is arranged on the bottom of the first housing 1. Part of the trigger structure 4 is exposed outside the first housing 1. When the second housing 5 is folded on the front side of the first housing 1, the wireless charging module 2 is limited in the receiving groove 11 and connected to the locking structure 3. When the second housing 5 is unfolded relative to the first housing 1, the trigger structure 4 is triggered to drive the locking structure 3 to switch to the unlocked state, causing the wireless charging module 2 to eject outward from the receiving groove 11. Since this charger adopts all the technical solutions of the above embodiments, it at least has all the beneficial effects brought by the technical solutions of the above embodiments, which will not be repeated herein.

The present disclosure further proposes a charger. As shown in FIGS. 8 to 24, the charger includes a wireless charging structure with an automatically ejecting wireless charging module. The specific structure of the wireless charging structure includes a first housing 1. A receiving groove 11 is defined on a front side of the first housing 1. A wireless charging module 2 that can flip outward is arranged in the receiving groove 11. A top of the wireless charging module 2 is elastically hinged to a top inside the receiving groove 11, such that the wireless charging module 2 has a tendency to flip outward from the receiving groove 11. A locking structure 3 and a trigger structure 4 are arranged inside the first housing 1. The locking structure 3 has two states: an unlocked state and a locked state. In the unlocked state, the locking structure 3 is separated from the wireless charging module 2, such that the wireless charging module 2 is ejected outward from the receiving groove 11. In the locked state, the locking structure 3 is connected to the wireless charging module 2, limiting the wireless charging module 2 in the receiving groove 11. The trigger structure 4 is configured to drive the locking structure 3, such that the locking structure 3 is separated from the wireless charging module 2.

A bottom of the first housing 1 is hinged with a second housing 5. The trigger structure 4 is arranged on the bottom of the first housing 1. Part of the trigger structure 4 is exposed outside the first housing 1. When the second housing 5 is folded on the front side of the first housing 1, the wireless charging module 2 is limited in the receiving groove 11 and connected to the locking structure 3. When the second housing 5 is unfolded relative to the first housing 1, the trigger structure 4 is triggered to drive the locking structure 3 to switch to the unlocked state, causing the wireless charging module 2 to eject outward from the receiving groove 11.

In the embodiments, the second housing 5 may serve as a base of the charger, mainly providing support. When the first housing 1 rotates away from the second housing 5 around a hinge position, causing the first housing 1 to rotate relative to the second housing 5 to a preset angle, the first housing 1 and the second housing 5 form a stand state. This preset angle is preferably convenient for supporting mobile phone electronic devices and convenient for placing the electronic device such as watches after the wireless charging module 2 is unfolded. For example, the preset angle may be 35 degrees to 75 degrees. It is understandable that when the charger can be used as a stand, a damping structure may be arranged on a hinge shaft between the first housing 1 and the second housing 5, such that the first housing 1 can be fixed relative to the second housing 5 at a preset position and will not shift after placing electronic devices. The outer contour shape of the second housing 5 may be set to be the same as the outer contour shape of the first housing 1. For example, both may be set as rectangular, rounded rectangular, race track shape, semi-race track shape, etc. The outer contour shapes of the second housing 5 and the first housing 1 may be set differently. The outer contour shapes of the two may be various, which are not specifically limited herein.

The hinge design between the first housing 1 and the second housing 5 gives the charger a foldable storage function. The trigger structure 4 is arranged at the bottom and partially exposed, ensuring that it can be mechanically triggered when the second housing 5 is unfolded. When the second housing 5 is folded, the trigger structure 4 is in a non-acting state, and the locking structure 3 remains connected, avoiding accidental ejection of the wireless charging module 2. When the second housing 5 is unfolded, the relative motion between the two housings directly drives the trigger structure 4 through mechanical linkage, releasing the limitation of the locking structure 3, causing the wireless charging module 2 to automatically eject under the action of the elastic hinge. This solution combines the device form transformation with function triggering by arranging the trigger structure 4 to form a mechanical linkage with the folding and unfolding action of the second housing 5. During the unfolding process of the second housing 5, the unlocking of the locking and the ejection action of the wireless charging module 2 of the first housing 1 are completed synchronously, without requiring the user to perform additional operations to trigger the button, thereby simplifying the use process and reducing operation steps. Moreover, since the trigger structure 4 completely relies on physical structure linkage, the risks of accidental triggering or electronic control failure are avoided, improving the reliability of the triggering operation.

In some embodiments, a first wireless charging component 52 is arranged inside the second housing 5 on a side facing the wireless charging module 2. The first wireless charging component 52 refers to a component that can transmit power to an electronic device in a wireless manner. The first wireless charging component 52 may include a circuit board and a transmitting coil. The transmitting coil is typically wound with copper wire (Litz Wire) into a circular or square shape. After power is applied, when a receiving coil of the electronic device is aligned with the transmitting coil of the first wireless charging component 52, the first wireless charging component 52 provides wireless power to the electronic device via electromagnetic induction or magnetic resonance principles. Specifically, the first wireless charging component 52 can perform wireless power transfer for electronic devices such as mobile phones and headphones. In this way, both the first housing 1 and the second housing 5 possess wireless charging functions, allowing simultaneous wireless charging of different electronic devices. For example, a watch can be placed on the wireless charging module extended from the first housing 1 for wireless charging, and earphones can be placed on the second housing 5 for wireless charging, thereby greatly enhancing user convenience.

In some embodiments, as shown in FIGS. 8 to 14, a mounting notch 16 is defined on the bottom of the first housing 1. A connecting sleeve 51 is arranged on a bottom of the second housing 5. The connecting sleeve 51 is rotatably arranged within the mounting notch 16. The trigger structure 4 includes a connecting arm 416. The connecting arm 416 extends outward from the first housing 1 through the mounting notch 16. A groove 511 is defined on an outer peripheral surface of the connecting sleeve 51 corresponding to the connecting arm 416. When the second housing 5 is folded onto the front side of the first housing 1, the connecting arm 416 is accommodated within the groove 511. When the second housing 5 is unfolded relative to the first housing 1, the connecting arm 416 can slide from the groove 511 to abut against the peripheral wall surface of the connecting sleeve 51, thereby pushing the trigger structure 4 via the peripheral wall surface of the connecting sleeve 51 to drive the locking structure 3 to switch to the unlocked state.

In the embodiments, the mounting notch 16 at the bottom of the first housing 1 and the connecting sleeve 51 at the bottom of the second housing 5 form a rotational fit. The connecting arm 416 of the trigger structure 4 extends to the outside of the first housing 1 through the mounting notch 16. When the second housing 5 is folded, the connecting arm 416 is completely embedded in the groove 511 to avoid accidental triggering. The engagement member 31 of the locking structure 3 is kept in the locked state by the second elastic member 32. When the second housing 5 is unfolded relative to the first housing 1, the contact position between the peripheral wall surface of the connecting sleeve 51 and the connecting arm 416 changes with the rotation. After the second housing 5 is unfolded beyond a preset angle, the peripheral wall surface of the connecting sleeve 51 pushes the connecting arm 416 to move, driving the trigger piece 41 to compress the third elastic member 412 and driving the engagement member 31 to rotate counterclockwise to the unlocked position. The wireless charging module 2 automatically ejects outward under the preload force of the top elastic hinge. When the second housing 5 is folded for storage, the groove 511 of the connecting sleeve 51 accommodates the connecting arm 416, and the trigger structure 4 is in a non-acting state. The engagement member 31 of the locking structure 3 maintains a tendency to rotate clockwise under the action of the second elastic member 32, firmly locking the wireless charging module 2. In this case, the third elastic member 412 is in a naturally extended state, and the trigger piece 41 slides away from the connection port 113 to the initial position, preparing for the next unfolding action.

By adjusting the position of the groove 511, the angle through which the first housing 1 needs to rotate to trigger the ejection of the wireless charging module 2 can be adjusted. For example: when an end of the connecting arm 416 away from the trigger piece 41 is placed at the bottom of the groove 511 or abuts against the bottom wall inside the groove 511, the wireless charging module 2 can be ejected after the first housing 1 rotates only a small angle. When the end of the connecting arm 416 away from the trigger piece 41 is placed in the middle of the groove 511, the first housing 1 needs to rotate a relatively larger angle before the bottom wall inside the groove 511 can contact the connecting arm 416 and push it, causing the wireless charging module 2 to eject.

In some embodiments, a connection port 113 communicating with the inner cavity of the first housing 1 is defined on a bottom of the receiving groove 11. The locking structure 3 includes a second elastic member 32 and an engagement member 31 arranged facing the connection port 113. The engagement member 31 is movably arranged inside the first housing 1. In the locked state, the wireless charging module 2 is arranged with a cooperating portion matching the connection port 113. A top end of the engagement member 31 is engaged with the cooperating portion via the connection port 113. The second elastic member 32 is arranged between the locking structure 3 and the first housing 1, and the second elastic member 32 is configured to provide an elastic force to the engagement member 31 to maintain engagement with the cooperating portion. The trigger structure 4 is configured to be triggered when the second housing 5 is unfolded relative to the first housing 1, to drive the top end of the engagement member 31 to disengage from the cooperating portion, causing the wireless charging module 2 to eject outward from the receiving groove 11.

In the embodiments, the connection port 113 refers to a through-hole structure penetrating the receiving groove 11 and the inner cavity of the housing. The through-hole structure may be rectangular, circular, or the like, and is configured to provide a channel for the engagement member 31 to contact the cooperating portion of the wireless charging module 2. The engagement member 31 refers to a locking component that can be adaptively locked with the cooperating portion, which may be specifically implemented using a metal or plastic buckle. The shape of the top end of the engagement member 31 and the cooperating portion form a complementary structure to achieve mechanical locking. The cooperating portion refers to a locking groove 22 or a snap-fit structure arranged on the wireless charging module 2, which may specifically be implemented using a locking groove 22 or an engagement boss. Its position is aligned with the connection port 113 to achieve precise engagement with the engagement member 31. The second elastic member 32 refers to an element that provides an elastic restoring force, which may be specifically a compression spring, torsion spring, tension spring, elastic rubber, or the like. The second elastic member 32 is arranged on a side of the engagement member 31 away from the connection port 113 to push against the engagement member 31. Therefore, the engagement member 31 is maintained in the locked state by the elastic force of the second elastic member 32. The elastic holding force of the second elastic member 32 and the driving stroke of the trigger structure 4 form a controllable mechanical balance, which not only ensures locking reliability but also ensures smoothness of the triggering operation. The elastic coefficient of the second elastic member 32 is required to enable balance of the locking holding force and the sensitivity of the triggering operation.

To facilitate the ejection and retraction of the wireless charging module 2, in practice, the cooperating portion is an engagement groove, and the top end of the engagement member 31 extends out of the connection port 113 to engage with the engagement groove. When the wireless charging module 2 is in the retracted state, the engagement member 31 passes through the connection port 113 under the elastic force of the second elastic member 32, and its top end forms a mechanical engagement with the cooperating portion of the wireless charging module 2, thereby restricting the wireless charging module 2 from flipping outward. By applying an external force to the trigger structure 4 (for example, the user manually triggers the trigger structure 4, or the trigger structure 4 is triggered by linkage with another module), the trigger structure 4 drives the engagement member 31 to overcome the elastic force of the second elastic member 32, causing the top end of the engagement member 31 to disengage from the cooperating portion. In this case, the wireless charging module 2 automatically ejects outward under the elastic force of the top elastic hinge. Mechanical locking between the engagement member 31 and the cooperating portion ensures the stability of the wireless charging module 2 in the retracted state. The driving operation of the trigger structure 4 on the engagement member 31 does not require direct contact with the surface of the wireless charging module, avoiding the risk of pinching the user's fingers. Moreover, the combination of the engagement member 31 and the second elastic member 32 simplifies the structural layout and reduces manufacturing costs.

This solution makes the trigger structure 4 form a mechanical linkage with the folding and unfolding action of the second housing 5, combining device form transformation with function triggering. During the unfolding process of the second housing 5, the unlocking and the ejection of the wireless charging module 2 of the first housing 1 are completed synchronously, without requiring the user to perform additional operations to trigger a button, thereby simplifying the use process and reducing operation steps. Moreover, since the trigger structure 4 completely relies on physical structure linkage, the risks of accidental triggering or electronic control failure are avoided, improving the reliability of the triggering operation.

In some embodiments, referring to FIGS. 1 to 7, an end of the engagement member 31 is rotatably connected to the first housing 1, and the other end of the engagement member 31 is elastically abutted against the inner wall of the first housing 1 through the second elastic member 32, such that the engagement member 31 has a tendency to rotate clockwise toward the outside of the connection port 113. When the second housing 5 is unfolded relative to the first housing 1, the trigger structure 4 is pushed to drive the engagement member 31 to rotate counterclockwise toward the inside of the connection port 113, such that the top end of the engagement member 31 separates from the cooperating portion.

In the embodiments, that one end of the engagement member 31 is rotatably connected to the first housing 1 means that the engagement member 31 forms a rotation fulcrum with the first housing 1 through a hinge shaft, which may be specifically implemented using a pin shaft and shaft hole matching structure. This structure allows the engagement member 31 to rotate around the fulcrum, providing rotational degrees of freedom for the locking and unlocking actions of the engagement member 31. The second elastic member 32 applies an elastic force to the engagement member 31 to keep it in an engaged position engaged with the cooperating portion. The second elastic member 32 makes the engagement member 31 maintain a tendency to rotate toward the outside of the connection port 113 in its natural state through elastic force, ensuring the stability of the locked state. That the trigger structure 4 can drive the engagement member 31 to rotate counterclockwise means changing the movement direction of the engagement member 31 through mechanical linkage or pushing, which may be specifically implemented using a sliding push rod or a swing arm structure. This driving method can overcome the elastic force of the second elastic member 32, forcing the engagement member 31 to disengage from the cooperating portion, achieving the unlocking function.

Specifically, the engagement member 31 is connected to the first housing 1 through the rotation fulcrum. Under the elastic force of the second elastic member 32, the free end of the engagement member 31 continuously presses toward the outside of the connection port 113, keeping the top end of the engagement member 31 engaged with the cooperating portion of the wireless charging module 2. When the trigger structure 4 is operated, a reverse force is applied to drive the engagement member 31 to rotate counterclockwise, and the top end of the engagement member 31 disengages from the cooperating portion, releasing the limitation on the wireless charging module 2. In this case, the wireless charging module 2 is ejected outward under the action of its own elastic hinge structure. After the trigger ends, the elastic force of the second elastic member 32 pushes the engagement member 31 to reset clockwise, re-entering the locking preparation state.

This solution makes the engagement member 31 cooperate with the elastic structure through a rotary connection, such that the locking structure 3 can stably limit the wireless charging module 2 in its natural state, and the trigger structure 4 drives the engagement member 31 to disengage through mechanical linkage, achieving one-handed unlocking operation. This design not only avoids direct contact of the user with the edge of the wireless charging module 2 but also ensures locking reliability through elastic reset, such that the locked state is automatically maintained without additional locking steps, reducing operational complexity and improving ease of use and safety. In addition, the engagement member 31 switches between the unlocked and locked states by rotation, which simplifies the locking structure 3 compared to the sliding switching method, while improving the smoothness of switching between engagement and disengagement of the engagement member 31 and the cooperating portion, thereby avoiding accidental jamming.

In some embodiments, the engagement member 31 includes an arc-shaped contact portion 311. The cooperating portion is a locking groove 22. A top end of the arc-shaped contact portion 311 protrudes from the connection port 113 and elastically abuts in the locking groove 22.

In a specific embodiment, the wireless charging module 2 has an outer peripheral wall, the locking groove 22 is defined on the outer peripheral wall, and the locking groove 22 is arranged in an arc shape. The arc-shaped contact portion 311 refers to a terminal structure of the engagement member 31 having an arc-shaped contact surface matching the curvature of the inner wall of the locking groove 22. The arc-shaped contact portion 311 and the locking groove 22 are kept in contact by the continuous pressure applied by the second elastic member 32. Specifically, in the locked state, the arc-shaped surface of the arc-shaped contact portion 311 forms surface contact with the inner wall of the locking groove 22, and the elastic force provided by the second elastic member 32 makes the engagement member 31 continuously press against the locking groove 22. In this case, the wireless charging module 2 is limited in the receiving groove 11. When the trigger structure 4 drives the engagement member 31 to rotate counterclockwise, the arc-shaped contact portion 311 disengages from contact along the arc-shaped trajectory of the inner wall of the locking groove 22. In this case, the elastic force of the first elastic member 112 pushes the wireless charging module 2 to flip outward and eject. The design of the top end of the arc-shaped contact portion 311 protruding from the connection port 113 makes it completely embedded in the locking groove 22 in the locked state, avoiding accidental disengagement due to vibration or external impact.

Compared with the related art, where traditional locking structures mostly adopt a point contact method of a right-angle buckle and a planar engagement groove, which has a small contact area and is prone to stress concentration, the curved surface contact method of the arc-shaped contact portion 311 and the locking groove 22 of the present disclosure increases the effective contact area and disperses the contact stress to the entire arc-shaped area. In the related art, the engagement member needs to overcome a large static friction force when disengaging, while in the present disclosure, the motion trajectory of the arc-shaped structure is consistent with the tangential direction of the inner wall of the locking groove 22, which may effectively reduce the friction during the process of the engagement member 31 disengaging from the locking groove 22. Moreover, the motion trajectory of the arc-shaped contact portion 311 disengaging from the locking groove 22 is optimized, reducing the driving force required by the trigger structure 4, while avoiding scratches and wear on the contact surfaces.

In some embodiments, as shown in FIGS. 8 to 24, a third housing 6 is slidably connected to the back of the first housing 1. A second wireless charging component 61 is arranged on a side of the third housing 6 facing away from the first housing 1.

In the embodiments, relative displacement between the third housing 6 and the first housing 1 is achieved through sliding connection. The extension direction of the third sliding groove 116 is configured to be consistent with the sliding direction of the second housing 5. Synchronous sliding of the third housing 6 and the second housing 5 may be achieved through linkage of sliding grooves and a slide rail 63. The third housing 6 can move horizontally, vertically, or diagonally relative to the first housing 1, which may be designed according to actual needs and is not specifically limited herein. By making the third housing 6 slidably connected to the back of the first housing 1, when needed, the third housing 6 can be slid upward relative to the first housing 1 to unfold, ensuring charging height. When not needed, the third housing 6 can be slid to be basically coincident or aligned with the first housing 1. In this way, the entire charger, when stored, takes a box shape, reducing the overall storage volume of the charger.

The second wireless charging component 61 refers to a component that can transmit power to an electronic device in a wireless manner. The second wireless charging component 61 may include a circuit board and a transmitting coil. The transmitting coil is typically wound with copper wire (Litz Wire) into a circular or square shape. After power is applied, when a receiving coil of the electronic device is aligned with the transmitting coil of the second wireless charging component 61, the second wireless charging component 61 provides wireless power to the electronic device via electromagnetic induction or magnetic resonance principles. Specifically, the second wireless charging component 61 can perform wireless power transfer for electronic devices such as mobile phones. In this way, the first housing 1, the second housing 5, and the third housing 6 all possess wireless charging functions, allowing simultaneous wireless charging of three different electronic devices. The coil sizes of the wireless charging module 2, the first wireless charging component 52, and the second wireless charging component 61 may be designed and selected according to the electronic devices to be charged. For example, a watch can be placed on the wireless charging module extended from the first housing 1 for wireless charging, earphones can be placed on the second housing 5 for wireless charging, and a watch can be magnetically attached and placed on the third housing 6 for wireless charging. Therefore, the charger of the present disclosure integrates three wireless charging structures, with high charging efficiency, saving user charging costs and space occupation, and the overall device is more compact, easy to carry, and convenient to use.

In some embodiments, referring to FIGS. 16 to 20, a wall surface of the third housing 6 facing the first housing 1 protrudes with at least one slider 611. The back of the first housing 1 defines a third sliding groove 116 corresponding to each slider 611. The slider 611 is limit-mounted within the third sliding groove 116 in the thickness direction of the first housing 1, and the slider 611 can slide along the extension direction of the third sliding groove 116. The charger further includes a torsion spring 17 arranged inside the first housing 1. The torsion spring 17 includes a torsion spring main body 171, a first torsion arm 172, and a second torsion arm 172 that are interconnected. The first torsion arm 172 is rotatably connected to the slider 611. The second torsion arm 172 is rotatably connected to the first housing 1. The torsion spring main body 171 is movably arranged in the first housing 1.

When the second housing 5 slides relative to the first housing 1, the slider 611 moves along the extension direction of the third sliding groove 116. The width of the slider 611 may be made greater than the width of the third sliding groove 116. For example, the cross-sectional shape of the slider 611 may be T-shaped, to limit the movement of the slider 611 in the thickness direction of the first housing 1, thereby preventing the third housing 6 from detaching from the first housing 1, and ensuring the linearity and precision of the sliding trajectory. Specifically, when the third housing 6 slides relative to the first housing 1, the movement of the slider 611 drives the torsion spring 17 to move. The first torsion arm 172 rotates around the main body of the torsion spring 17, causing elastic deformation. The second torsion arm 172 converts the elastic potential energy of the torsion spring 17 into an auxiliary force for pushing or resetting the slider 611 through a fixed connection. For example, during the unfolding process of the third housing 6, the sliding of the slider 611 compresses the torsion spring 17, causing it to store elastic potential energy. When the third housing 6 is folded, the torsion spring 17 releases potential energy to assist the slider 611 in resetting. Through the limitation of the third sliding groove 116 and the elastic reset of the torsion spring 17, the sliding process of the third housing 6 is constrained to a predetermined path, avoiding jamming or deviation, while reducing the thrust required for user operation.

The present disclosure may solve the problem of deviation or jamming during the sliding process of the third housing 6 due to lack of limitation. The cooperation of the third sliding groove 116 and the slider 611 ensures the precision of the sliding path. In addition, the elastic deformation of the torsion spring 17 automatically applies auxiliary thrust or resetting force during the sliding process, reducing the force required for user operation and enhancing the stability of the structure in the unfolded or folded state. Two ends of the torsion spring 17 are respectively connected to the slider 611 and the first housing 1, making the sliding action and the elastic force form a linkage mechanism, thereby further optimizing the operational smoothness and structural reliability.

In some of the above schemes of the present disclosure, a solution is proposed where the third housing 6 slides through the cooperation of the slider 611 and the third sliding groove 116 and the torsion spring 17. However, when the third housing 6 slides up and down along the first housing 1, if only a single slider 611 or torsion spring 17 is provided, it may lead to uneven force during sliding, affecting sliding smoothness and structural stability, and it is difficult to ensure the balance and synchronization of the third housing 6 during sliding.

In this regard, the present disclosure further proposes that the third housing 6 can slide along the first housing 1 in the up and down direction away from or towards the second housing 5. Each of the left and right sides of the second housing 5 is arranged with a slider 611. The left and right sides of the first housing 1 define two third sliding grooves 116 corresponding to the two sliders 611. Each slider 611 is correspondingly arranged with a corresponding torsion spring 17.

The sliders 611 are symmetrically distributed on the left and right sides of the second housing 5. The third sliding grooves 116 are symmetrically defined on both sides of the first housing 1 and form sliding pairs with the sliders 611. Each slider 611 is independently connected to a corresponding torsion spring 17. The torsion arms of the torsion springs 17 are rotatably connected to the slider 611 and the first housing 1, respectively. The symmetrical layout of the sliders 611 and the third sliding grooves 116 forms a bidirectional sliding support structure. The torsion springs 17 on both sides independently apply elastic forces to balance the sliding resistance. By making the third housing 6 slide up and down, when unfolded, the height of the third housing 6 relative to the supporting surface can be raised, thereby meeting the charging height requirement for mobile phones while maintaining a small volume.

When the third housing 6 slides up and down along the first housing 1, the sliders 611 on the left and right sides move synchronously within their corresponding third sliding grooves 116. The torsion springs 17 on both sides apply reverse torque to the slider 611 and the first housing 1 respectively through their torsion arms, ensuring that the elastic forces acting on both sides of the third housing 6 are evenly distributed during the sliding process. The third sliding grooves 116 constrain the lateral displacement of the sliders 611, preventing the third housing 6 from deviating laterally during sliding. The independent installation of the torsion springs 17 on both sides allows for individual adjustment of the preload during assembly, for example, by rotating the main body of the torsion spring 17 to change the angle of the torsion arms, thereby compensating for force differences on both sides caused by manufacturing tolerances. The symmetrical distribution of the sliders 611 may further ensure that the center of gravity of the third housing 6 always moves along the central axis of the first housing 1 during sliding, thereby avoiding jamming or tilting due to unilateral force. When the third housing 6 is subjected to an external load, the cooperation between the third sliding grooves 116 and the sliders 611 on both sides may disperse the load to the left and right side walls of the first housing 1, thereby improving the overall structure's torsional stiffness.

To make the up-and-down sliding of the third housing 6 smoother, the present disclosure further proposes that one of opposing wall surfaces of the third housing 6 and the first housing 1 is arranged with a vertically extending slide rail 63, and the other of the of opposing wall surfaces of the third housing 6 and the first housing 1 defines a recessed fixing groove 19 corresponding to the slide rail 63. A ball 191 is movably arranged within the fixing groove 19. The ball 191 movably abuts against the slide rail 63. Through the cooperation of the ball 191 and the slide rail 63, the up-and-down sliding of the third housing 6 becomes smoother, thereby avoiding mutual friction and potential damage to the housings when the third housing 6 slides up and down relative to the first housing 1.

As shown in FIGS. 15-24, the present disclosure further provides a wireless charger, including a second housing 5 and a first housing 1 connected to the second housing 5. A third housing 6 is slidably arranged in an up and down direction on the first housing 1. The third housing 6 is arranged with a second charging module for wirelessly charging an electronic device such as mobile phones.

As shown in FIGS. 15-19, in the embodiments, at least one slider 611 is arranged on a side of the third housing 6 close to the first housing 1. A third sliding groove 116 corresponding to the slider 611 is vertically defined through a side of the first housing 1 close to the third housing 6. The slider 611 slidably passes through the third sliding groove 116. When the third housing 6 slides up and down relative to the first housing 1 to adjust the height of the charging position, the slider 611 also slides up and down within the third sliding groove 116. When the slider 611 slides to a highest point within the third sliding groove 116, the third housing 6 is at its highest position. Conversely, when the slider 611 slides to a lowest point within the third sliding groove 116, the third housing 6 is at its lowest position. To prevent the slider 611 from falling out of the third sliding groove 116, both left and right sides of an end of the slider 611 away from the third housing 6 are protruded with fixing lugs 6111. The distance between opposing outer sides of the two fixing lugs 6111 (i.e., a leftmost side of a left fixing lug 6111 and a rightmost side of a right fixing lug 6111) is greater than the width of the third sliding groove 116.

Figure 17:
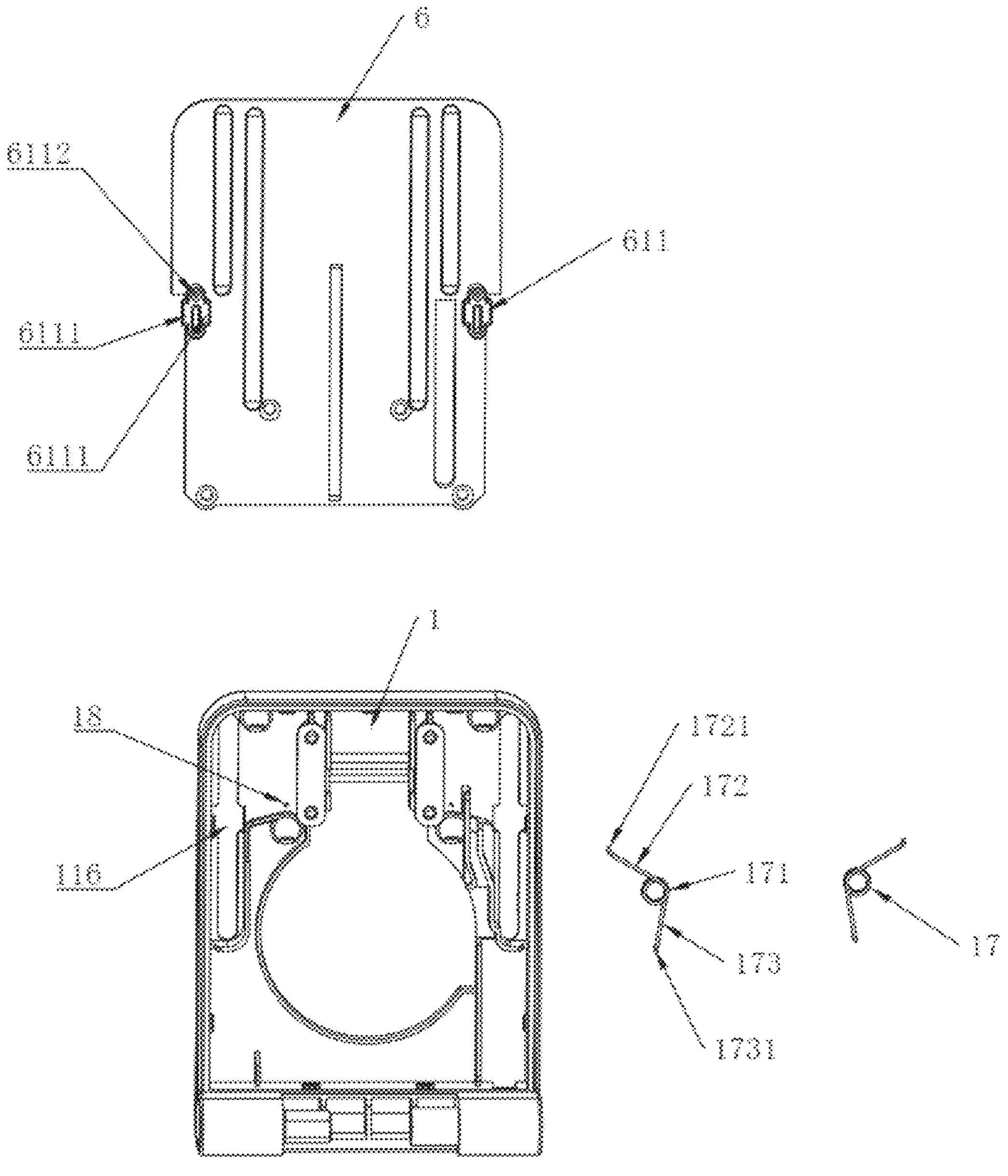
FIG. 17 is a schematic structural diagram of a first housing and a third housing in FIG. 16.
Figure 18:
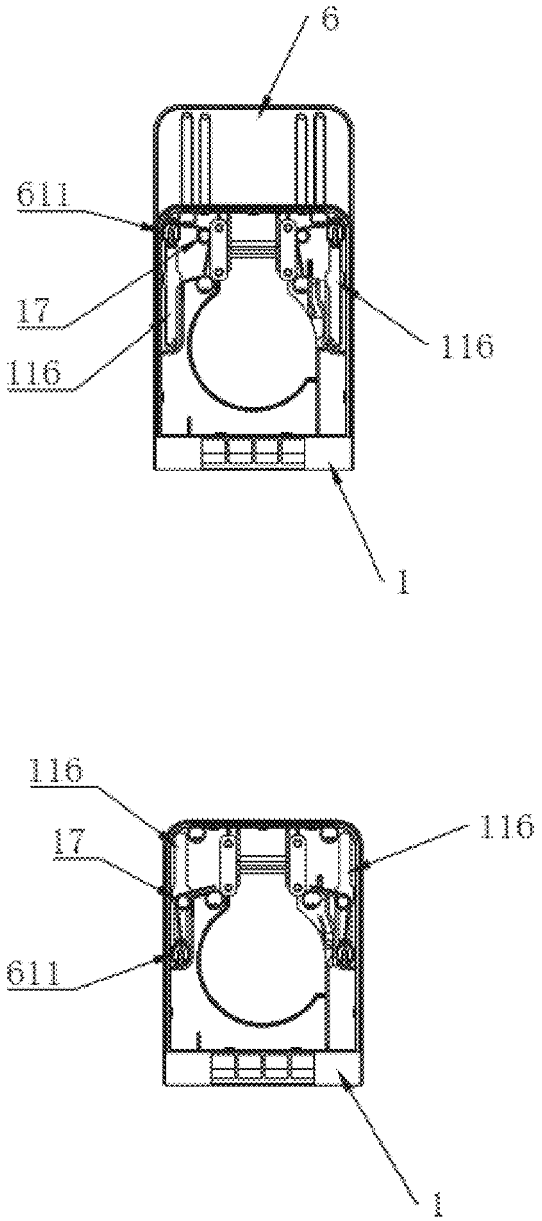
FIG. 18 is a schematic diagram of sliding of the first housing and the third housing in FIG. 16.

As shown in FIGS. 17-18, the number of sliders 611 may be one, two, three, etc. To make the sliding of the third housing 6 more stable, in the embodiments, the number of sliders 611 is two. The sliders 611 are arranged on the left and right sides of the third housing 6 close to the first housing 1. The sliders 611 are arranged parallel to each other, and the corresponding third sliding grooves 116 are also arranged parallel to each other.

Figure 19:
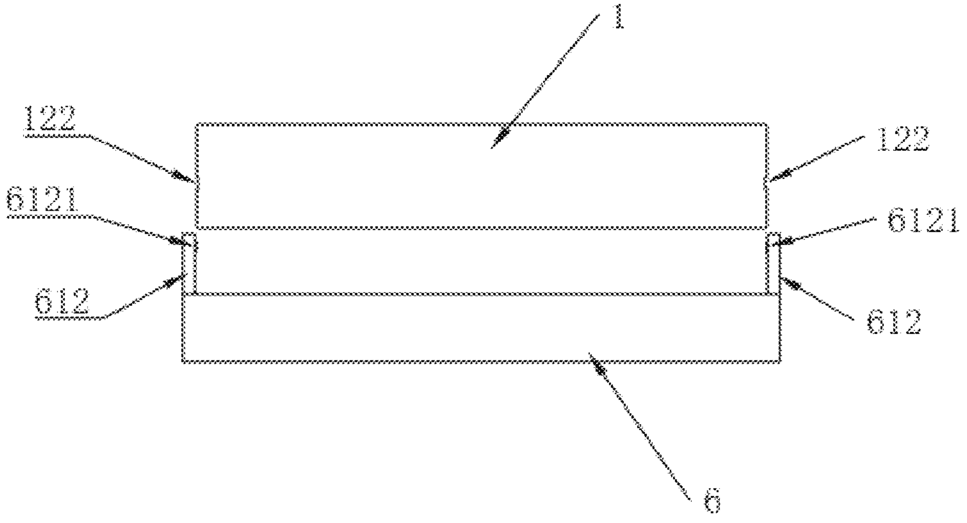
FIG. 19 is a schematic diagram of a fixing plate and a fixing sliding groove of the present disclosure.

As shown in FIG. 19, in other embodiments, two fixing plates 612 are arranged in parallel on the left and right sides of the third housing 6 close to the first housing 1. The distance between the opposing inner sides of the two fixing plates 612 (i.e., a rightmost side of a left fixing plate 612 and a leftmost side of a right fixing plate 612) is adapted to the distance between the left and right sides of the first housing 1. A fixing sliding groove 122 is recessed vertically on each of the left and right sides of the first housing 1. A slider 6121 is protruded on the inner side of each of the two fixing plates 612. The slider 6121 is slidably embedded in the fixing sliding groove 122. By providing the fixing plates 612, the sliders 6121, and the fixing sliding grooves 122, the up-and-down sliding of the third housing 6 can be achieved. When the slider 6121 slides to the highest point within the fixing sliding groove 122, the third housing 6 is at its highest position. Conversely, when the slider 6121 slides to the lowest point within the fixing sliding groove 122, the third housing 6 is at its lowest position.

Figure 16:
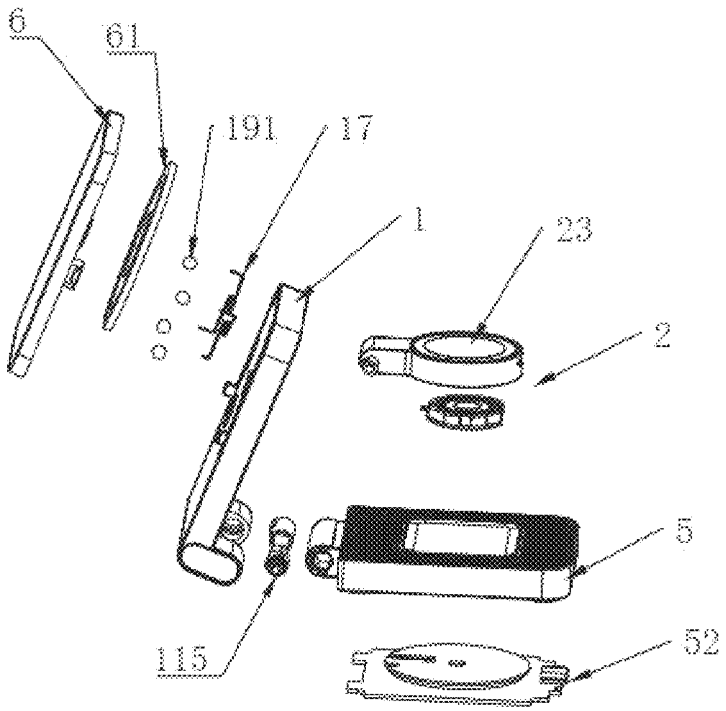
FIG. 16 is an exploded view of the charger in FIG. 15.

As shown in FIGS. 16-18, a torsion spring 17 is further arranged inside the first housing 1. The torsion spring 17 includes a spring main body 171 movably arranged inside the first housing 1, a first torsion arm 172 extending from an end of the spring main body 171, and a second torsion arm 173 extending from the other end of the spring main body 171. An end of the first torsion arm 172 away from the spring main body 171 is rotatably arranged on the slider 611. An end of the second torsion arm 173 away from the spring main body 171 is rotatably arranged on the inner wall of the first housing 1. Specifically, a first "L"-shaped fixing rod 1721 is arranged on the end of the first torsion arm 172 away from the spring main body 171. A first fixing hole 6112 is defined on an end of the slider 611 away from the third housing 6. The first "L"-shaped fixing rod 1721 is rotatably passed through the first fixing hole 6112. A second "L"-shaped fixing rod 1731 is arranged on the end of the second torsion arm 173 away from the spring main body 171. A second fixing hole 18 is defined on the inner wall of the first housing 1. The second "L"-shaped fixing rod 1731 is rotatably passed through the second fixing hole 18. When the slider 611 slides up and down within the third sliding groove 116, the slider 611 drives the first torsion arm 172 to move up and down, and drives the spring main body 171 and the second torsion arm 173 to rotate around the second fixing hole 18. During the up-and-down sliding of the slider 611, the first torsion arm 172 and the second torsion arm 173 cooperate to drive the rotation of the spring main body 171 for energy storage. When the up-and-down sliding of the slider 611 causes the first fixing hole 6112 and the second fixing hole 18 to be on the same horizontal plane, the torsion of the spring main body 171 is greatest. In this case, whether the slider 611 slides up or down, the torsion will gradually decrease. When the slider 611 slides to the highest point within the third sliding groove 116, the torsion of the spring main body 171 is relatively small. When the slider 611 slides to the lowest point within the third sliding groove 116, the torsion of the spring main body 171 is also relatively small (or disappears). By providing the torsion spring 17, assistance and limitation may be provided for the up-and-down sliding of the third housing 6, making it easier for the user to slide the third housing 6.

Figure 20:
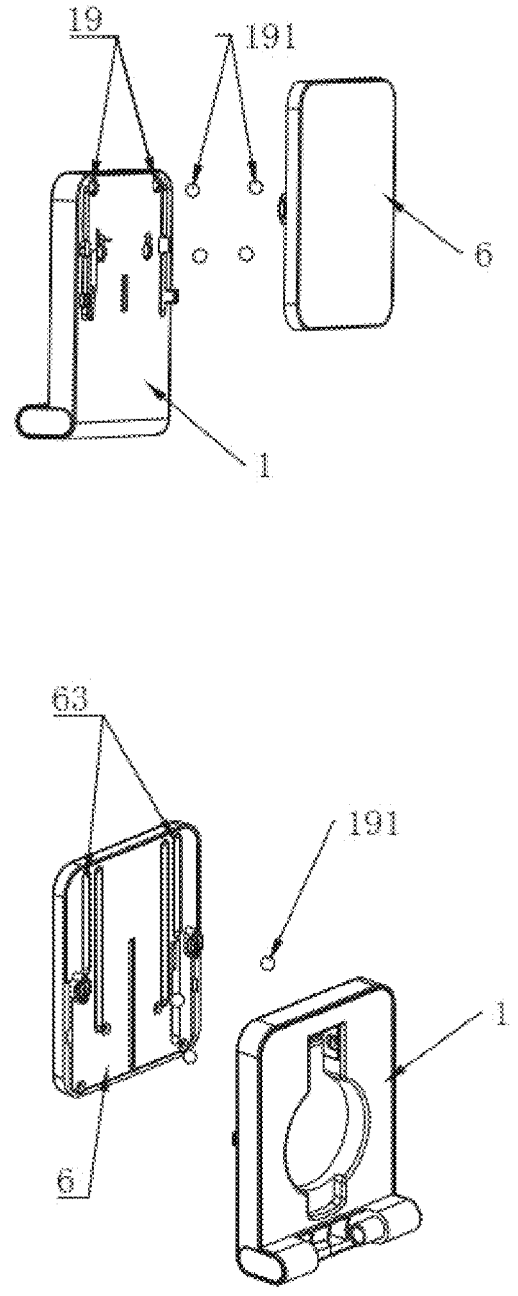
FIG. 20 is a schematic diagram of a first housing and a third housing according to other embodiments of the present disclosure.

As shown in FIG. 20, to make the up-and-down sliding of the third housing 6 smoother, at least one slide rail 63 is arranged vertically on a side of the third housing 6 close to the first housing 1. At least one fixing groove 19 corresponding to the slide rail 63 is recessed on a side of the first housing 1 close to the third housing 6. A ball 191 is movably arranged within the fixing groove 19. An end of the ball 191 away from a bottom wall of the fixing groove 19 passes through the fixing groove 19 and movably abuts against the slide rail 63. Through the cooperation of the ball 191 and the slide rail 63, the up-and-down sliding of the third housing 6 becomes smoother, thereby avoiding mutual friction and potential damage to the housings when the third housing 6 slides up and down relative to the first housing 1.

Figure 21:
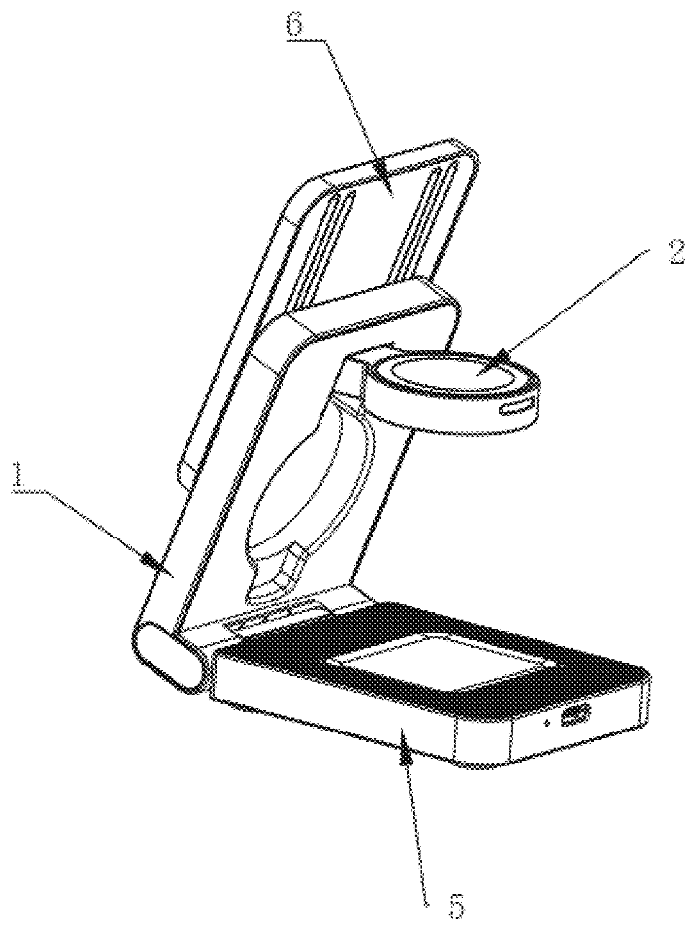
FIG. 21 is a schematic diagram of a usage state of the charger of the present disclosure.
Figure 22:
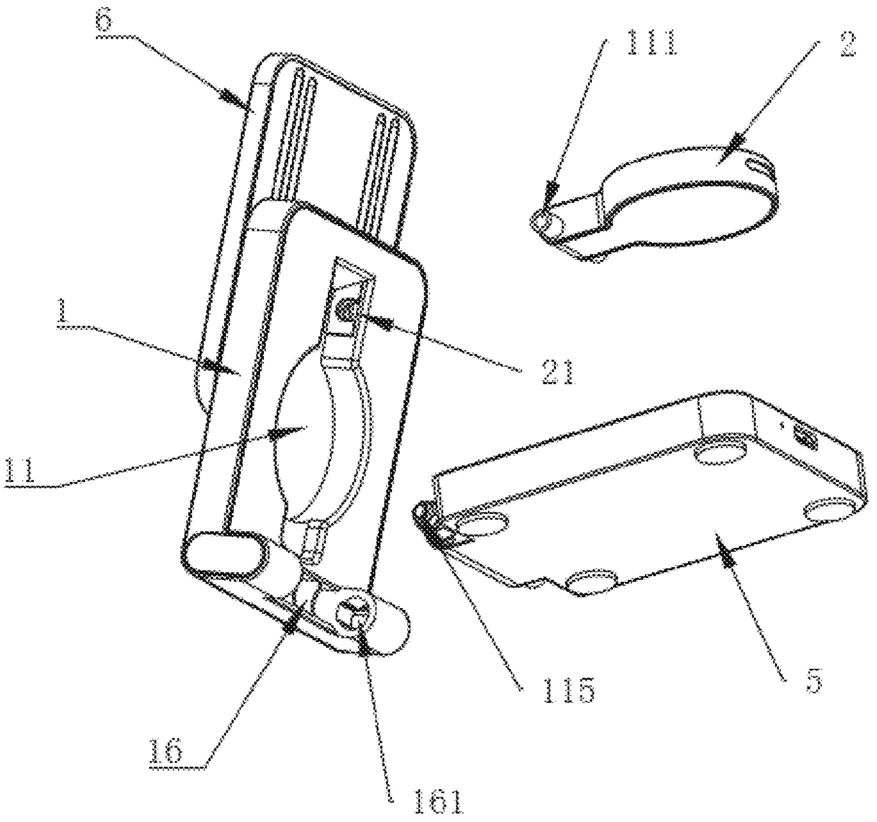
FIG. 22 is a partial exploded view of the charger in FIG. 21.

As shown in FIGS. 21-22, a receiving groove 11 is recessed on a side of the first housing 1 away from the third housing 6. A wireless charging module 2 for charging an electronic device such as watches is rotatably arranged within the receiving groove 11. The wireless charging module 2 includes a wireless charging housing. A third wireless charging component is arranged inside the wireless charging housing. Specifically, a first hinge shaft 111 is arranged on an end of the wireless charging housing. Hinge holes 21 are defined on both the left and right sides of a top inside the receiving groove 11. Left and right ends of the first hinge shaft 111 are respectively and movably passed through the hinge holes 21 on the left and right sides at the top inside the receiving groove 11. By providing the rotatable wireless charging module 2, the angle of the wireless charging module 2 can be adjusted for placing and charging the electronic device such as watches. Moreover, the wireless charging module 2 can be stored in the receiving groove 11, which does not additionally increase the volume of the wireless charger, making it convenient for users to carry.

Figure 23:
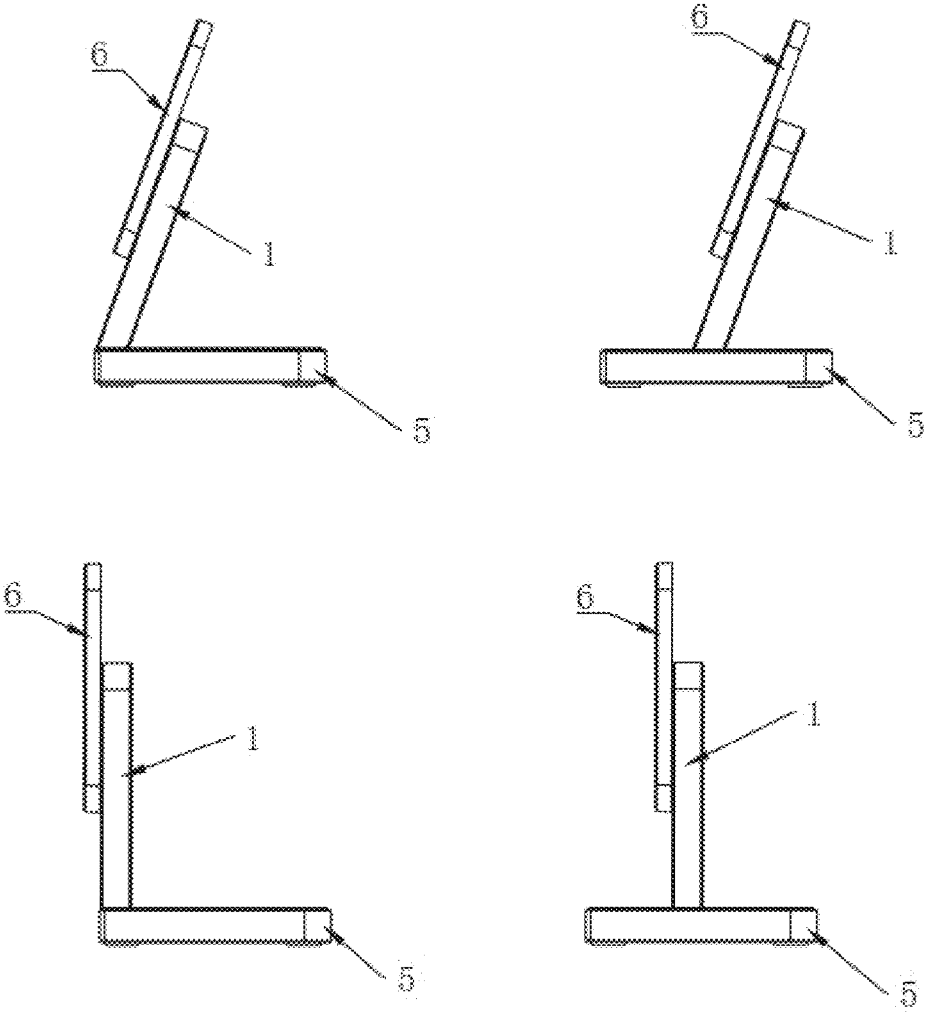
FIG. 23 is a schematic diagram of the connection between a first housing and a third housing of the present disclosure.

As shown in FIG. 23, in other embodiments, a second housing 5 is fixedly connected to the first housing 1. The second housing 5 may be arranged on a top or side edge of the first housing 1 at a vertical or inclined angle, causing the two to present a "stand" state, thereby enabling a function of leaning a mobile phone against the third housing 6 for charging. By sliding the third housing 6 up and down, the height of the third housing 6 can be adjusted, thereby matching the charging position of mobile phones of different models (or different sizes). The second housing 5 and the first housing 1 may be integrally formed.

Figure 24:
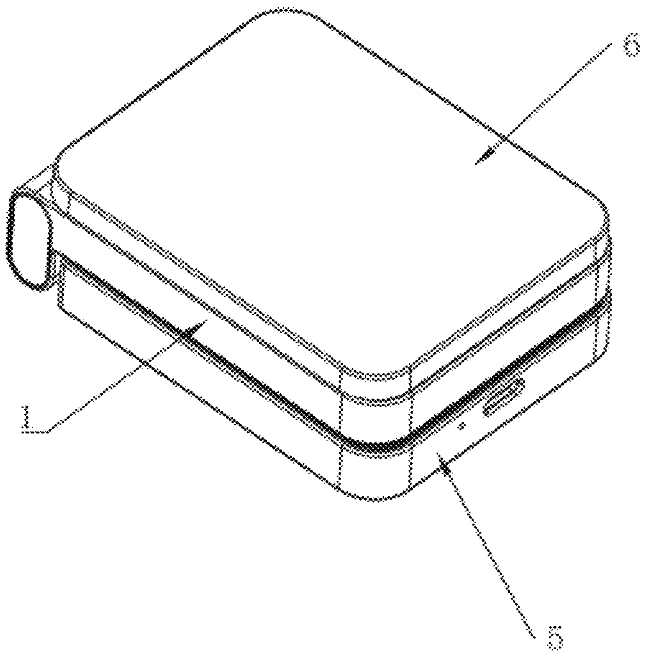
FIG. 24 is a schematic diagram of a folded state according to the present disclosure.
Figure 25:
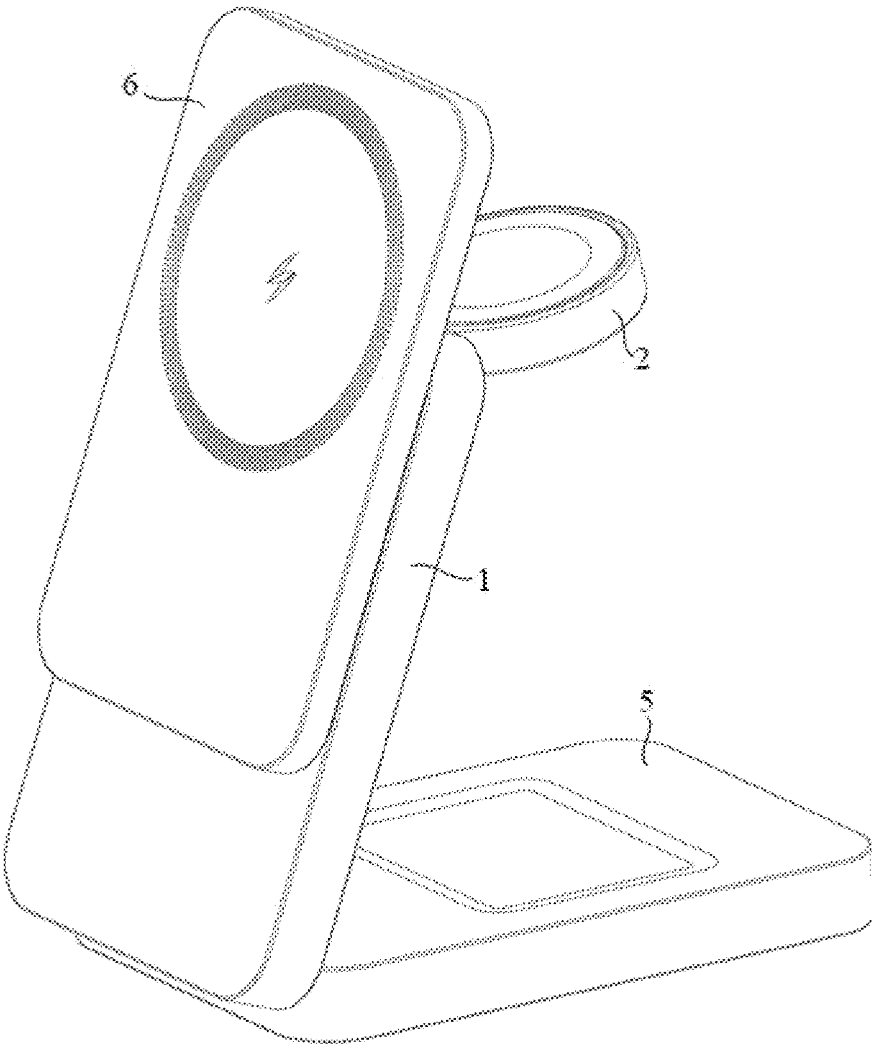
FIG. 25 is a first perspective view of a wireless charger according to a third implementation of the present disclosure.
Figure 26:
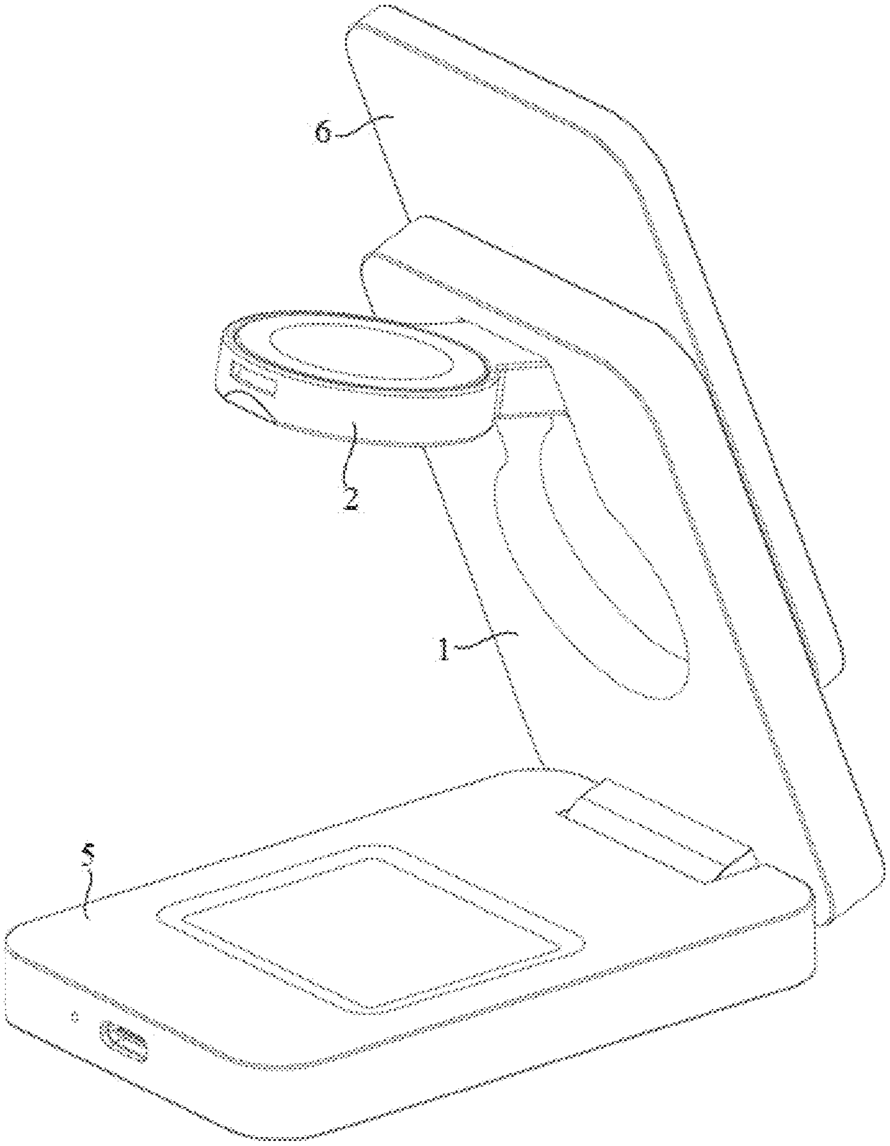
FIG. 26 is a second perspective view of the wireless charger in FIG. 25.
Figure 27:
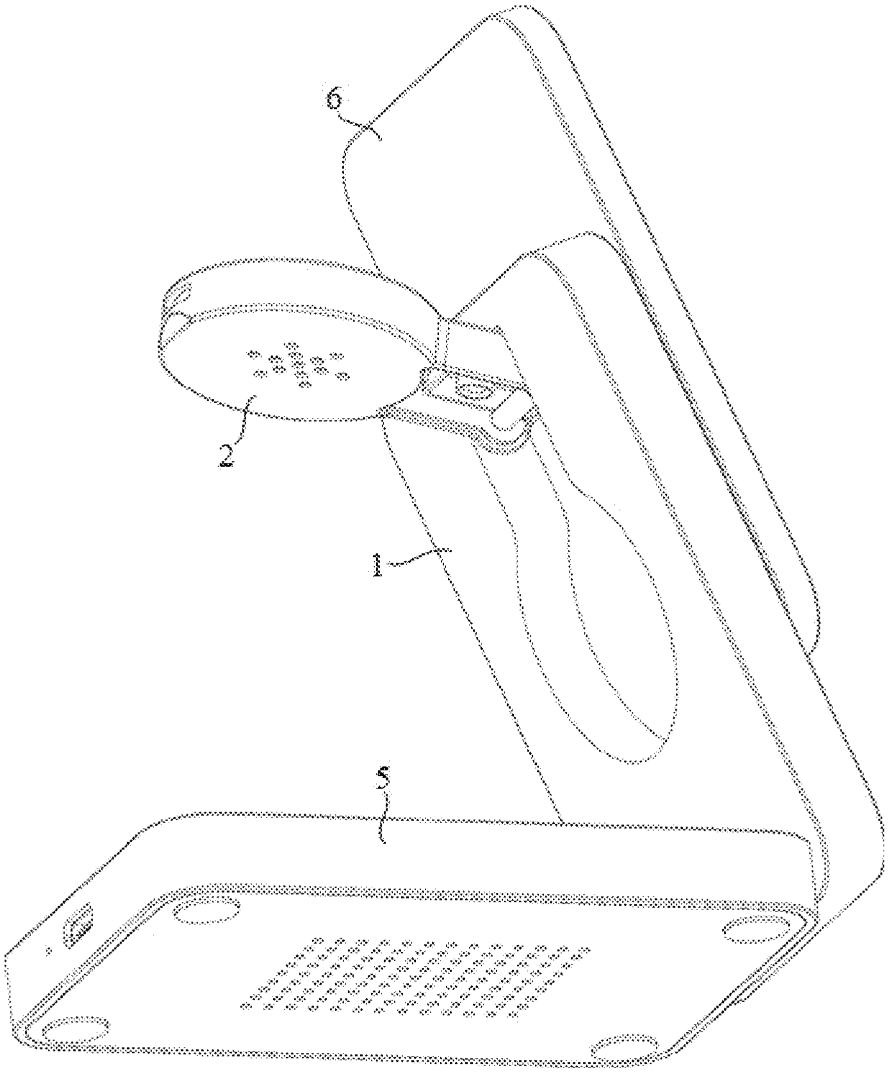
FIG. 27 is a third perspective view of the wireless charger in FIG. 25.
Figure 28:
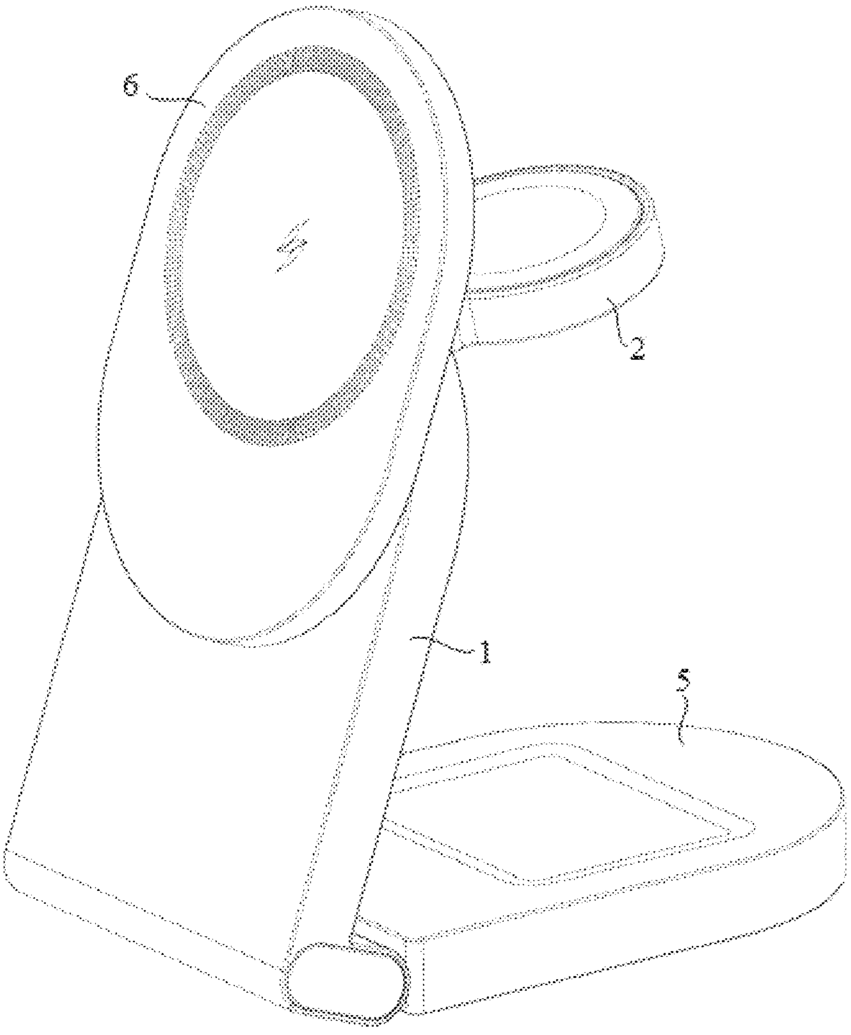
FIG. 28 is a first perspective view of a wireless charger according to a fourth implementation of the present disclosure.
Figure 29:
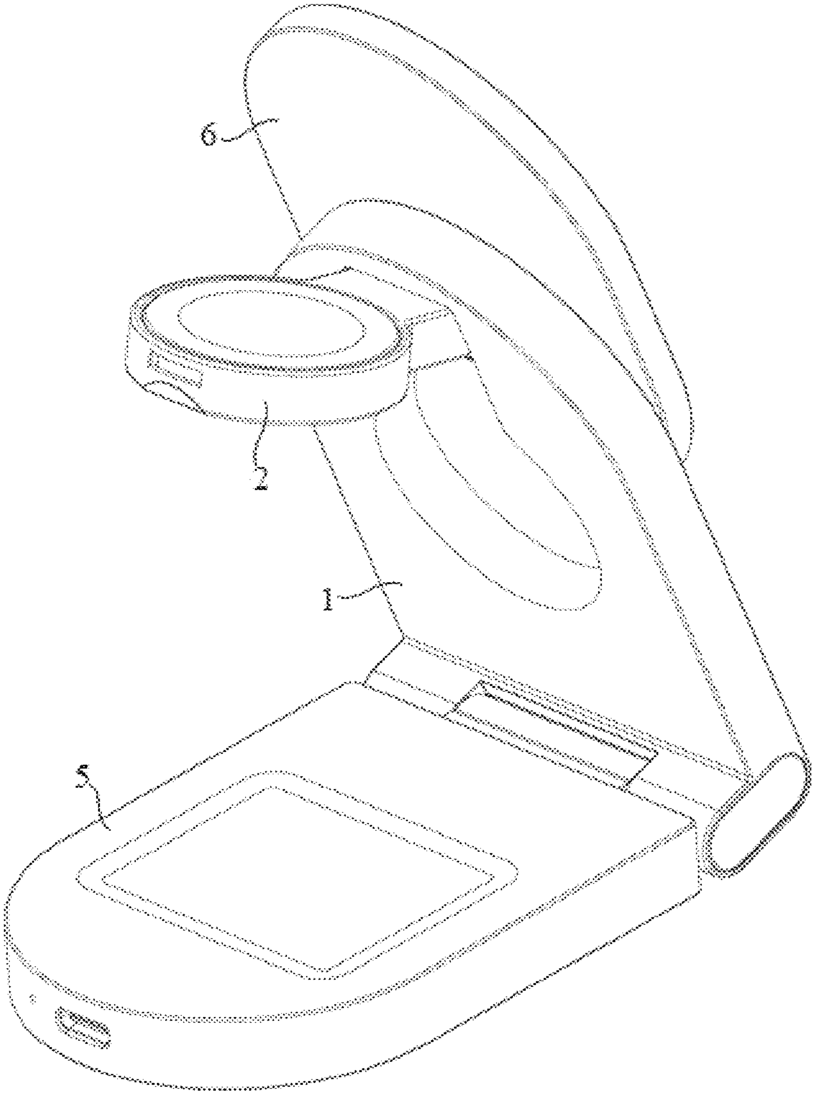
FIG. 29 is a second perspective view of the wireless charger in FIG. 28.
Figure 30:
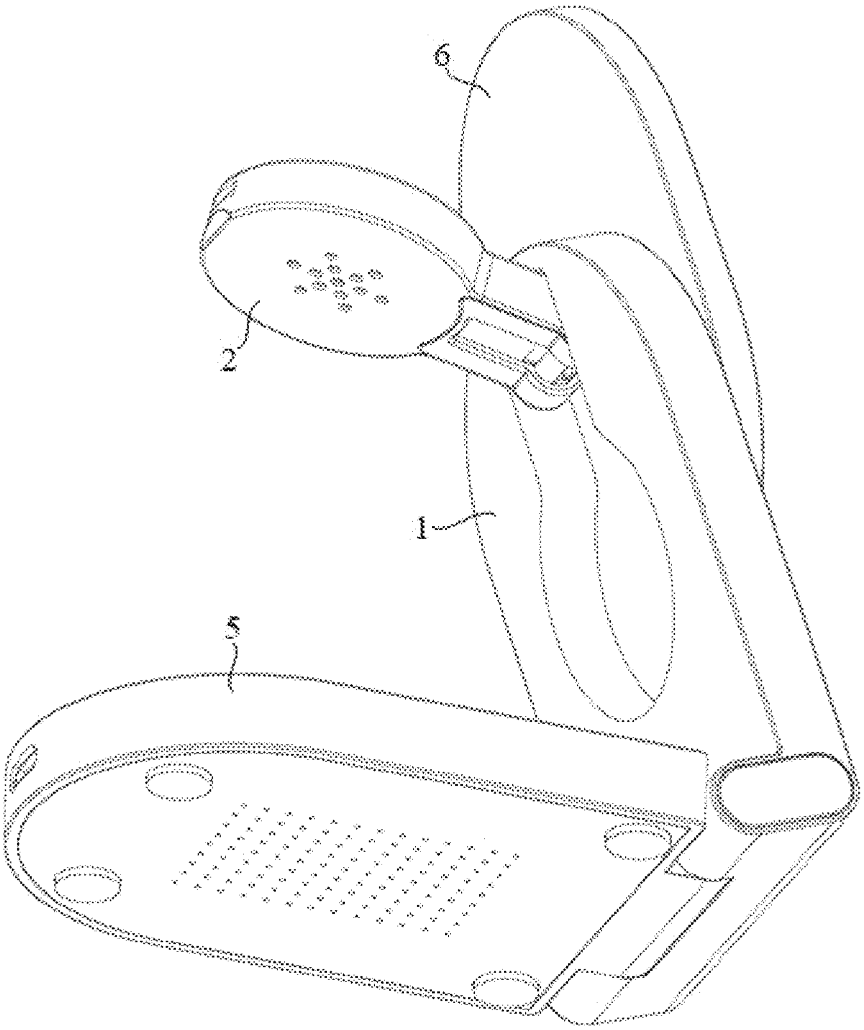
FIG. 30 is a third perspective view of the wireless charger in FIG. 28.
Figure 31:
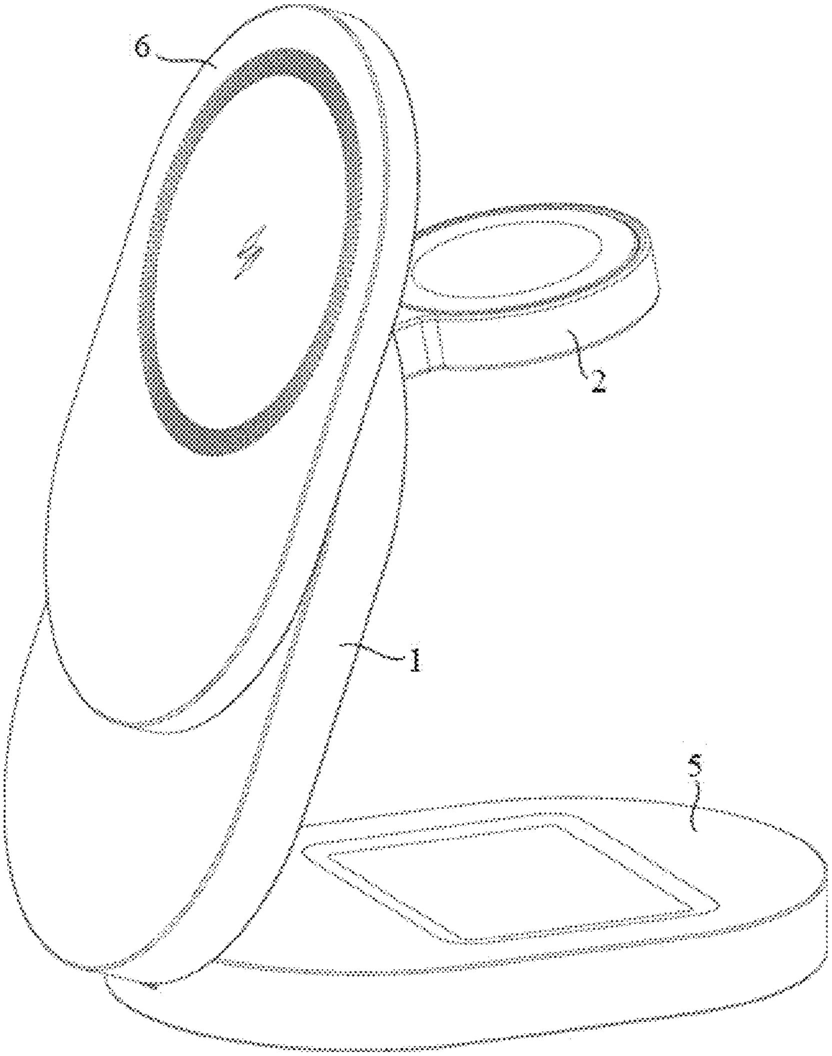
FIG. 31 is a first perspective view of a wireless charger according to a fifth implementation of the present disclosure.
Figure 32:
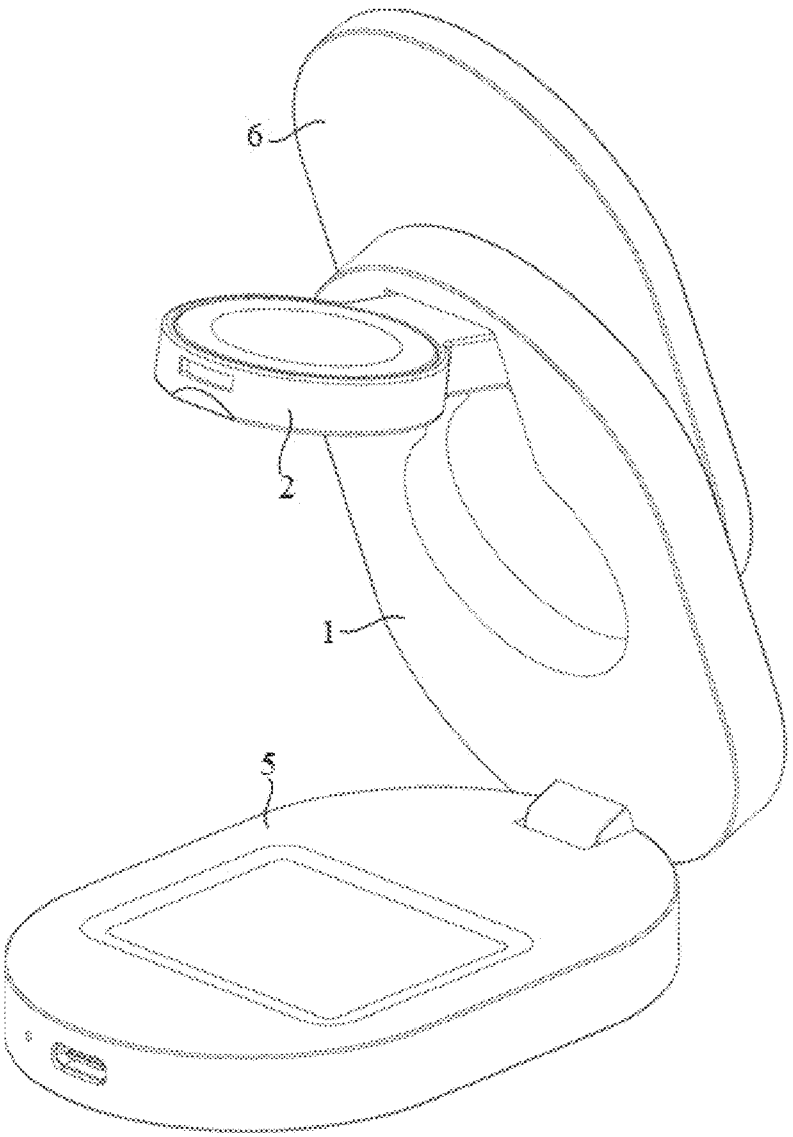
FIG. 32 is a second perspective view of the wireless charger in FIG. 31.
Figure 33:
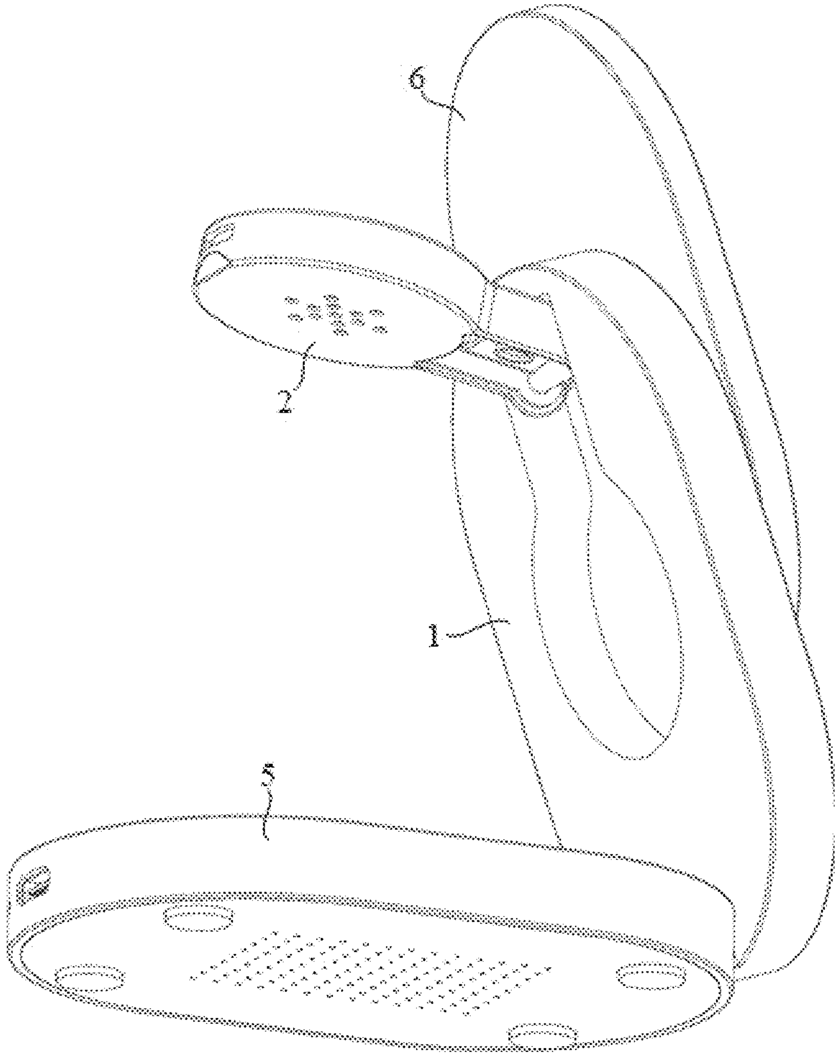
FIG. 33 is a third perspective view of the wireless charger in FIG. 31.

As shown in FIGS. 22 and 24, in the embodiments, the bottom end of the first housing 1 is rotatably connected to the side edge of the second housing 5, allowing the first housing 1 to move relatively closer to or away from the second housing 5. The second housing 5 may serve as a base of the wireless charger. When the first housing 1 moves close to the second housing 5 and fits against it, the wireless charger achieves a folded effect, facilitating user portability. When the first housing 1 moves away from the second housing 5, causing a certain angle (e.g., 30 degrees, 60 degrees, 90 degrees) between them, the second housing 5 and the first housing 1 achieve the effect of a "stand", facilitating users to charge electronic devices or use it as a stand. The third housing 6 is arranged on a side of the first housing 1 away from the second housing 5. The rotatable connection between the second housing 5 and the first housing 1 may be achieved using existing hinge components. For example, a first hinge shaft 111 is arranged on an end of the second housing 5, a mounting notch 16 is defined on a corresponding bottom end of the first housing 1, and mounting holes 161 are respectively defined on the left and right sides inside the mounting notch 16. By rotatably passing both ends of the first hinge shaft 111 through the mounting holes 161 on both sides, the relative rotation between the second housing 5 and the first housing 1 can be achieved.

As shown in FIG. 16, a first wireless charging component 52 is arranged inside the second housing 5. The first wireless charging component 52 can charge an electronic device such as earphones placed on the second housing 5.

In the embodiments, the second charging module, the third wireless charging component, and the first wireless charging component 52 may each be an existing wireless charging coil, or a combination of a wireless charging coil and a charging mainboard, or a combination of a wireless charging coil, a charging mainboard, and a magnetic attraction component. Electronic devices can be wirelessly charged via the wireless charging coils. The magnetic attraction component can cooperate with the magnetic attraction component inside the electronic device to correspondingly attract the electronic device onto each wireless charging component, facilitating the fixing of the electronic device and also making the charging state more stable.

Finally, it should be noted that the above embodiments are only provided to illustrate the technical solutions of the present disclosure, and are not intended to limit them. Although the present disclosure has been described in detail with reference to the foregoing embodiments, those skilled in the art should understand that they can still modify the technical solutions recorded in the foregoing embodiments, or equivalently replace some of the technical features; and these modifications or replacements do not cause the essence of the corresponding technical solutions to depart from the spirit and scope of the technical solutions of the various embodiments of the present disclosure.

What is claimed is:

1. A wireless charging structure with a wireless charging module that is capable of automatically ejecting, comprising: a first housing;

wherein a front side of the first housing defines a receiving groove, the wireless charging module is arranged in the receiving groove and capable of flipping outward; a top of the wireless charging module is elastically hinged to a top inside the receiving groove, causing the wireless charging module to have a tendency to flip outward from the receiving groove; a locking structure and a triggering structure are further arranged inside the first housing;

wherein the locking structure has an unlocked state and a locked state; in the unlocked state, the locking structure is separated from the wireless charging module, causing the wireless charging module to be automatically ejected outward from the receiving groove; in the locked state, the locking structure is connected to the wireless charging module, limiting the wireless charging module within the receiving groove;

the triggering structure is configured to drive the locking structure to separate from the wireless charging module;

wherein a connection port communicating with an inner cavity of the first housing is defined on a wall of the receiving groove; the locking structure comprises a second elastic member and an engagement member facing the connection port; the engagement member is movably arranged inside the first housing;

the wireless charging module is arranged with a cooperating portion matching the connection port; in the locked state, a top end of the engagement member engages with the cooperating portion via the connection port; the second elastic member is arranged between the locking structure and the first housing, and the second elastic member is configured to provide an elastic force to the engagement member to maintain engagement with the cooperating portion; the triggering structure is configured to be able to drive the top end of the engagement member to disengage from the cooperating portion.

2. The wireless charging structure according to claim 1, wherein one of the top of the receiving groove and the top of the wireless charging module is arranged with a first hinge shaft, and the other of the top of the receiving groove and the top of the wireless charging module defines a hinge hole, the first hinge shaft being movably passed through the hinge hole; the first hinge shaft is arranged with a first elastic member, and the wireless charging module has a tendency to flip outward from the receiving groove under an elastic force of the first elastic member.

3. The wireless charging structure according to claim 1, wherein an end of the engagement member is rotatably connected to the first housing, and another end of the engagement member is elastically abutted against an inner wall of the first housing through the second elastic member, causing the engagement member to have a tendency to rotate clockwise toward an outside of the connection port; the triggering structure is capable of driving the engagement member to rotate counterclockwise toward an inside of the connection port, causing the top end of the engagement member to be separated from the cooperating portion.

4. The wireless charging structure according to claim 3, wherein the engagement member comprises an arc-shaped contact portion, the cooperating portion is a locking groove, a top end of the arc-shaped contact portion protrudes from the connection port and elastically abuts within the locking groove.

5. The wireless charging structure according to claim 4, wherein at least one of the following:

a top of a front side of the arc-shaped contact portion is arranged with a guiding inclined surface; or a connection between a bottom surface and a peripheral wall surface of the wireless charging module is arranged with an avoidance inclined surface corresponding to the arc-shaped contact portion.

6. The wireless charging structure according to claim 3, wherein the triggering structure comprises a trigger piece and a driving member; the driving member is rotatably connected to the engagement member, and the trigger piece is slidably arranged in the first housing along an opening direction of the connection port, for driving the driving member to link the engagement member to rotate and disengage from the cooperating portion.

7. The wireless charging structure according to claim 6, wherein an end of the engagement member away from the second elastic member is arranged with a swing arm; a first hinge portion is arranged on the swing arm, and a second hinge portion is arranged on a side of the first hinge portion away from the connection port; the first hinge portion is hinged to the inner wall of the first housing, and the driving member is hinged to the second hinge portion; the driving member and the swing arm are in a limiting cooperation in a clockwise rotation direction of the engagement member, and the driving member is rotatable relative to the swing arm in a counterclockwise rotation direction of the engagement member;

in a case where the trigger piece slides toward a side close to the connection port, the driving member is driven to link the engagement member to rotate counterclockwise to an unlocked position; and in a case where the trigger piece slides toward a side away from the connection port, the engagement member is caused to rotate clockwise to a locked position under an action of the second elastic member.

8. The wireless charging structure according to claim 7, wherein a second sliding groove is defined on a side of the trigger piece facing the driving member; a middle portion of a bottom wall of the second sliding groove toward the driving member protrudes with a first arc-shaped protrusion, and a top wall of the first arc-shaped protrusion smoothly transitions to the bottom wall of the second sliding groove;

the driving member comprises a driving arm; in a case where the trigger piece moves to a position where a top surface of the first arc-shaped protrusion abuts against the driving arm, the engagement member is driven to rotate clockwise to disengage from the cooperating portion; in a case where an end of the driving arm slidably abuts against the bottom wall of the second sliding groove on either of both sides of the first arc-shaped protrusion, the engagement member is located at the locked position where the engagement member is capable of engaging with the cooperating portion.

9. The wireless charging structure according to claim 8, wherein a side of the swing arm near the driving arm at the first hinge portion protrudes with a first stopper, and the driving member protrudes with a second stopper corresponding to the first stopper; the first stopper and the second stopper are in a limiting cooperation in the clockwise rotation direction of the engagement member.

10. The wireless charging structure according to claim 9, wherein a side of the swing arm away from the trigger piece is arranged with an arc-shaped elastic arm, and a side of the driving member facing away from the trigger piece is arranged with a cam; a free end of the arc-shaped elastic arm abuts against a curved surface of the cam, and the driving member has a tendency to rotate clockwise around the second hinge portion under an action of the arc-shaped elastic arm.

11. The wireless charging structure according to claim 3, wherein the triggering structure comprises a trigger piece, and a first sliding groove is defined inside the first housing; the trigger piece is movably arranged in the first sliding groove; a front side of an end of the trigger piece away from the wireless charging module protrudes with a connecting arm, and the first housing further defines a travel notch communicating with the first sliding groove and corresponding to the connecting arm; the connecting arm is exposed outside the first housing through the travel notch.

12. The wireless charging structure according to claim 11, wherein an end of the engagement member away from the second elastic member is arranged with a swing arm; the trigger piece protrudes with a second arc-shaped protrusion; the swing arm is arranged with a third arc-shaped protrusion on a movement path of the second arc-shaped protrusion; in a case where the trigger piece slides toward a side close to the connection port to a position where a first arc-shaped protrusion abuts against a top of the second arc-shaped protrusion, the engagement member is pushed to rotate counterclockwise to an unlocked position; in a case where the trigger piece slides toward a side away from the connection port to a position where the first arc-shaped protrusion and the top of the second arc-shaped protrusion are separated from each other, the engagement member is caused to rotate clockwise to a locked position under an action of the second elastic member.

13. The wireless charging structure according to claim 11, wherein a third elastic member is arranged in the first sliding groove, and the third elastic member is clamped between the inner wall of the first housing and an end of the trigger piece facing the connection port, causing the trigger piece to have a tendency to slide toward a side away from the connection port under an action of the third elastic member.

14. The wireless charging structure according to claim 3, wherein the triggering structure comprises a trigger piece, and the trigger piece is a toggle button arranged on the engagement member; the front side of the first housing defines a toggle groove; an end of a front side of the trigger piece is fixed on an arc-shaped contact portion of the engagement member, and an end of a back side of the trigger piece is movably passed through the toggle groove, causing the engagement member to be driven to rotate counterclockwise in a case where an external force toggles the toggle button.

15. The wireless charging structure according to claim 3, wherein the triggering structure comprises a trigger piece, and the trigger piece is a knob rotatably arranged inside the first housing; a side of the trigger piece away from the engagement member passes through the first housing and is exposed outward; one of a side of the trigger piece opposite the engagement member and the engagement member defines an engagement groove, and the other of the side of the trigger piece and the engagement member is arranged with a toggle rod; the toggle rod is passed through a slot in a manner allowing up and down swinging, causing the engagement member to be driven to switch between an open position and a locked position in a case where the trigger piece rotates.

16. A charger, comprising the wireless charging structure according to claim 1, wherein a bottom of the first housing of the wireless charging structure is hinged with a second housing; the triggering structure is arranged on the bottom of the first housing; a part of the triggering structure of the wireless charging structure is exposed outside the first housing;

in a case where the second housing is folded onto the front side of the first housing, the wireless charging module is limited within the receiving groove of the first housing and is connected to the locking structure of the wireless charging structure;

in a case where the second housing is unfolded relative to the first housing, the trigger structure is triggered to drive the locking structure to switch to the unlocked state, causing the wireless charging module to be ejected outward from the receiving groove.

17. The charger according to claim 16, wherein a first wireless charging component is arranged inside the second housing on a side facing the wireless charging module.

18. The charger according to claim 16, wherein the bottom of the first housing defines a mounting notch; a bottom of the second housing is arranged with a connecting sleeve, and the connecting sleeve is rotatably arranged within the mounting notch; the trigger structure comprises a connecting arm, and the connecting arm extends out of the first housing through the mounting notch; a groove is defined on an outer peripheral surface of the connecting sleeve corresponding to the connecting arm;

in a case where the second housing is folded onto the front side of the first housing, the connecting arm is accommodated within the groove;

in a case where the second housing is unfolded relative to the first housing, the connecting arm is slidable from the groove to abut against a peripheral wall surface of the connecting sleeve, to push the trigger structure via the peripheral wall surface of the connecting sleeve to drive the locking structure to switch to the unlocked state.

19. The charger according to claim 16, wherein a back side of the first housing is slidably connected with a third housing, and a side of the third housing facing away from the first housing is arranged with a second wireless charging component.

20. The charger according to claim 19, wherein a wall surface of the third housing facing the first housing protrudes with at least one slider; a back side of the first housing defines at least one third sliding groove each corresponding to a corresponding slider of the at least one slide; the at least one slider is limit-mounted in the at least one third sliding groove in a thickness direction of the first housing, and the at least one slider is slidable along an extension direction of the at least one third sliding groove;

the charger further comprises at least one torsion spring arranged inside the first housing; each of the at least one torsion spring comprises a torsion spring main body, a first torsion arm, and a second torsion arm that are interconnected; the first torsion arm is rotatably connected to the at least one slider; the second torsion arm is rotatably connected to the first housing, and the torsion spring main body is movably arranged in the first housing.

21. The charger according to claim 20, wherein the third housing is slidable along the first housing in an up and down direction away from or toward the second housing; the at least one slider is two sliders; each of left and right sides of the second housing is arranged with a corresponding slider of the two sliders;

the at least one third sliding groove is two third sliding grooves; left and right sides of the first housing define the two third sliding grooves corresponding to the two sliders;

the at least one torsion spring is two torsion springs, and each of the two sliders is arranged with a corresponding one of the two torsion springs.

22. A charger, comprising: a wireless charging structure comprising a first housing and a wireless charging module that is capable of automatically ejecting;

wherein a front side of the first housing defines a receiving groove, the wireless charging module is arranged in the receiving groove and capable of flipping outward; a top of the wireless charging module is elastically hinged to a top inside the receiving groove, causing the wireless charging module to have a tendency to flip outward from the receiving groove; a locking structure and a triggering structure are further arranged inside the first housing;

wherein the locking structure has an unlocked state and a locked state; in the unlocked state, the locking structure is separated from the wireless charging module, causing the wireless charging module to be automatically ejected outward from the receiving groove; in the locked state, the locking structure is connected to the wireless charging module, limiting the wireless charging module within the receiving groove;

the triggering structure is configured to drive the locking structure to separate from the wireless charging module;

wherein a bottom of the first housing of the wireless charging structure is hinged with a second housing; the triggering structure is arranged on the bottom of the first housing; a part of the triggering structure of the wireless charging structure is exposed outside the first housing;

in a case where the second housing is folded onto the front side of the first housing, the wireless charging module is limited within the receiving groove of the first housing and is connected to the locking structure of the wireless charging structure;

in a case where the second housing is unfolded relative to the first housing, the triggering structure is triggered to drive the locking structure to switch to the unlocked state, causing the wireless charging module to be ejected outward from the receiving groove;

wherein a connection port communicating with an inner cavity of the first housing is defined on a bottom of the receiving groove; the locking structure comprises a second elastic member and an engagement member arranged facing the connection port; the engagement member is movably arranged inside the first housing;

the wireless charging module is arranged with a cooperating portion matching the connection port; in the locked state, a top end of the engagement member engages with the cooperating portion via the connection port; the second elastic member is arranged between the locking structure and the first housing, and the second elastic member is configured to provide an elastic force to the engagement member to maintain engagement with the cooperating portion; the triggering structure is configured to be triggered in a case where the second housing is unfolded relative to the first housing, to drive the top end of the engagement member to disengage from the cooperating portion, causing the wireless charging module to be ejected outward from the receiving groove.

23. The charger according to claim 22, wherein an end of the engagement member is rotatably connected to the first housing, and another end of the engagement member is elastically abutted against an inner wall of the first housing through the second elastic member, causing the engagement member to have a tendency to rotate clockwise toward an outside of the connection port;

in a case where the second housing is unfolded relative to the first housing, the triggering structure is pushed to drive the engagement member to rotate counterclockwise toward an inside of the connection port, causing the top end of the engagement member to be separated from the cooperating portion.

24. The charger according to claim 23, wherein the engagement member comprises an arc-shaped contact portion; the cooperating portion is a locking groove, and a top end of the arc-shaped contact portion protrudes from the connection port and elastically abuts within the locking groove.

* * * * *